(12) United States Patent
Takakura et al.

(10) Patent No.: US 6,286,306 B1
(45) Date of Patent: Sep. 11, 2001

(54) EXHAUST GAS PURIFICATION SYSTEM OF INTERNAL COMBUSTION ENGINE

(75) Inventors: Shiro Takakura; Yuji Yasui; Tadashi Satoh; Yoshihisa Iwaki; Masaki Ueno; Masahiro Sato, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/498,653

(22) Filed: Feb. 7, 2000

(30) Foreign Application Priority Data

Feb. 8, 1999 (JP) .................................. 11-030252
Oct. 19, 1999 (JP) .................................. 11-297377

(51) Int. Cl.[7] ........................................ F01N 3/00
(52) U.S. Cl. .............................. 60/288; 60/286; 60/289
(58) Field of Search ...................... 60/278, 286, 287, 60/288, 289, 297, 311; 181/218, 264, 268

(56) References Cited

U.S. PATENT DOCUMENTS

| 5,067,319 | * | 11/1991 | Moser ................................ 60/288 |
| 5,331,809 | * | 7/1994 | Takeshima et al. ................. 60/288 |
| 5,650,599 | * | 7/1997 | Madden et al. .................... 181/218 |
| 5,771,690 | * | 6/1998 | Kakizaki et al. .................... 60/288 |
| 5,910,097 | * | 6/1999 | Boegner et al. ..................... 60/297 |
| 5,911,681 | * | 6/1999 | Tanaka et al. ...................... 60/278 |
| 5,934,071 | * | 8/1999 | Schatz ................................ 60/288 |
| 5,946,906 | * | 9/1999 | Akazaki et al. .................... 60/288 |
| 5,956,947 | * | 9/1999 | Tanaka et al. ...................... 60/278 |
| 6,082,100 | * | 7/2000 | Boegner et al. .................... 60/278 |

FOREIGN PATENT DOCUMENTS

| 8-71427 | 3/1996 | (JP) . |
| 9-72210 | 3/1997 | (JP) . |
| 9-324621 | 12/1997 | (JP) . |

* cited by examiner

Primary Examiner—Thomas Denion
Assistant Examiner—Tu M. Nguyen
(74) Attorney, Agent, or Firm—Arent Fox Kintner Plotkin & Kahn, PLLC

(57) ABSTRACT

A system for purifying exhaust gas generated by an internal combustion engine having a bypass exhaust gas passage branching from an exhaust pipe which is opened or closed by a switch-over valve, and an adsorbent which adsorbs unburneds component in the exhaust gas installed at the bypass exhaust passage. In the system, when the engine operation is within a high engine speed and high load region, the switch-over valve is operated to open the bypass exhaust gas passage to reduce noise due to switch-over valve chattering, etc. Similarly, the bypass exhaust gas passage is opened at that range, when the exhaust gas temperature is greater or equal to a predetermined value, to introduce high temperature exhaust gas to burn away cloggy material adhered to the adsorbent which would otherwise deteriorate or degrade the adsorbent.

26 Claims, 17 Drawing Sheets

HC ADSORBING

ADSORBENT TEMPERATURE RISING

ADSORBENT TEMPERATURE RISING

HC ADSORBING

ADSORBENT TEMPERATURE RISING

ADSORBENT TEMPERATURE RISING

ADSORBENT REGENERATION

EXHAUST GAS PURIFICATION SYSTEM OF INTERNAL COMBUSTION ENGINE

BACKGROUND OF THE INVENTION

1. Field of the Invention

This invention relates to an exhaust gas purification system of an internal combustion engine having a catalyst or an adsorbent stored in a bypass exhaust gas passage (branched from the exhaust pipe and opened/closed by a switch-over valve) which adsorbs unburned components such as hydrocarbons (HC) of the exhaust gas generated by the engine to enhance exhaust gas purification. More particularly it relates to a system for controlling the operation of opening the switch-over valve at high engine speeds and loads to reduce noise and to introduce heated exhaust gas to burn cloggy material, such as soot away from the adsorbent, to prevent the adsorbent from deteriorating and regenerating the same.

2. Description of the Related Art

Internal combustion engines are ordinarily provided with a catalyst (a three-way catalytic converter) in the exhaust system which removes HC, NOx and CO components in the exhaust gas generated by the engine. However, when the engine is cold started, for example, and the catalyst is not activated, unburned components of the exhaust gas, in particular, unburned hydrocarbons (HC) are immediately released into the atmosphere. An exhaust gas purification system is therefore proposed, in which the exhaust pipe is branched out at a location downstream of the catalyst and the bypass exhaust gas passage is provided with a lightoff catalyst with an electric heater (for speedily activating the catalyst) or an adsorbent (a kind of catalyst made of a zeolite material or some similar materials) which adsorbs unburned components such as the HC content when the catalyst is not activated and desorbs the same to be recirculated into the engine intake system and burned again in the combustion chambers after the catalyst has been activated. A switch-over valve is provided at the branching point to regulate the introduction of exhaust gas into the bypass exhaust gas passage.

When the exhaust system is configured to have such a bypass exhaust gas passage branching from the exhaust pipe, the switch-over valve may sometimes chatter due to the pulsation of exhaust gas pressure and makes noise.

In order to solve this problem, Japanese Laid-Open Patent Application No. Hei 9 (1997)-72, 210 proposes a switch-over valve installed at the branching point of the exhaust pipe in such manner that, the disc of the valve is faced, at one surface, to the exhaust pipe through a first opening (exhaust pipe inner wall defining the main exhaust gas passage), and is faced, at the other surface, to the bypass exhaust gas passage through a second opening. In this prior art, the area of the second opening is configured to be smaller than that of the first opening in such a way that the difference between the pressures acting on the valve discs becomes less, thereby suppressing the valve disc chattering and hence, reducing noise due to the chattering.

However, this prior art is disadvantageous, in that it requires a complicated valve structure design to suppress the chattering.

Moreover, in this kind of internal combustion engine having the main exhaust gas passage and bypass exhaust gas passage, opening/closing of the intake and exhaust valves generates a pulsatory sound which may sometimes be amplified by the resonance in the main exhaust gas passage and the bypass exhaust gas passage. However, the aforesaid prior art does not cope with the reduction of this kind of noise.

SUMMARY OF THE INVENTION

The first object of this invention is therefore to provide an internal combustion engine having a bypass exhaust gas passage branched from the exhaust pipe defining a main exhaust gas passage and a switch-over valve for opening/closing the bypass exhaust gas passage, which reduces noise due to the chattering of the switch-over valve and the resonance of the pulsatory sound generated by the opening/closing of the intake and exhaust valves.

Further, when the engine is provided with an exhaust gas purification system having an adsorbent installed at the bypass exhaust gas passage which adsorbs the unburned component such as the unburned HC component of the exhaust gas at the time of the engine starting, since the operation of the exhaust gas purification system is conducted by operating the switch-over valve, this would cause an interference between the operation of the switch-over valve for noise reduction. Therefore, it becomes necessary to avoid any interferences between the operation of the switch-over valve for exhaust gas purification and that for noise reduction.

The second object of this invention is therefore to provide an exhaust gas purification system of an internal combustion engine having an adsorbent, which adsorbs unburned components of the exhaust gas generated by the engine, installed at a bypass exhaust gas passage branched from the exhaust pipe defining a main exhaust gas passage and a switch-over valve for opening/closing the bypass exhaust gas passage, which reduces noises due to the chattering of the switch-over valve and due to the resonance of the pulsatory sound generated by the opening/closing of the intake and exhaust valves, without causing any interference with the switch-over valve operation of the exhaust gas purification.

Also, cloggy material such as soot, adheres to the adsorbent as the repetition of the exhaust gas purification increases and clogs the adsorbent. This deteriorates and degrades the performance of the adsorbent.

In view of the above, Japanese Laid-Open Patent Application No. 9 (1997)-324,621 teaches detecting the engine operating condition such as the time when the fuel supply is cut off or the air/fuel ratio is controlled to a lean value where the oxygen concentration in the exhaust gas is relatively high and introduces the exhaust gas into the bypass exhaust gas passage by operating the switch-over valve to open the passage so as to burn away the adhered cloggy material from the adsorbent and to regenerate or renew the adsorbent.

More specifically, this prior art system is configured to introduce the exhaust gas to heat and raise the temperature of the adsorbent such that the temperature rise will promote the oxygen to react with the cloggy material to burn it away from the adsorbent.

However, in order to determine the engine operating condition where the exhaust gas temperature becomes high enough to regenerate the adsorbent, the prior art system does not detect the exhaust gas temperature directly. Rather, the prior art system simply detects the engine operating conditions where the fuel cutoff is in progress or the air/fuel ratio is controlled to a lean value and conducts the adsorbent regeneration. With this, the prior art system can not always achieve the regeneration of adsorbent to a satisfactory extent.

The third object of this invention is therefore to provide an exhaust gas purification system of an internal combustion engine having an adsorbent, which adsorbs unburned components of the exhaust gas generated by the engine, installed at a bypass exhaust gas passage branched from the exhaust pipe defining a main exhaust gas passage and a switch-over valve for opening/closing the bypass exhaust gas passage, which detects the exhaust gas temperature and when the detected exhaust gas temperature is greater or equal to a predetermined temperature, introduces the exhaust gas to burn away the cloggy material from the adsorbent, thereby regenerating the adsorbent to a satisfactory extent.

This invention achieves this object by providing a system for purifying exhaust gas generated by an interal combustion engine having a bypass exhaust gas passage branching from an exhaust pipe and is opened or closed by a switch-over valve, and at least one of a catalyst and an adsorbent which adsorbs unburned components in the exhaust gas installed at the bypass exhaust passage, comprising: engine operating condition detecting means for detecting operating conditions of the engine including at least engine speed and engine load; high engine speed and load region determining means for comparing the detected engine speed and engine load with predetermined values and for determining whether engine operation is within a high engine speed and high load region; and switch-over valve operating means for operating the switch-over valve to open the bypass exhaust passage if the bypass exhaust passage is closed when the engine operation is determined to be within the high engine speed and high load region.

BRIEF EXPLANATION OF THE DRAWINGS

These and other objects and advantages of the invention will become more apparent from the following descriptions and drawings, in which.

PREFERRED EMBODIMENTS OF THE INVENTION

Embodiments of the invention will now be explained with reference to the drawings.

Figure 1:
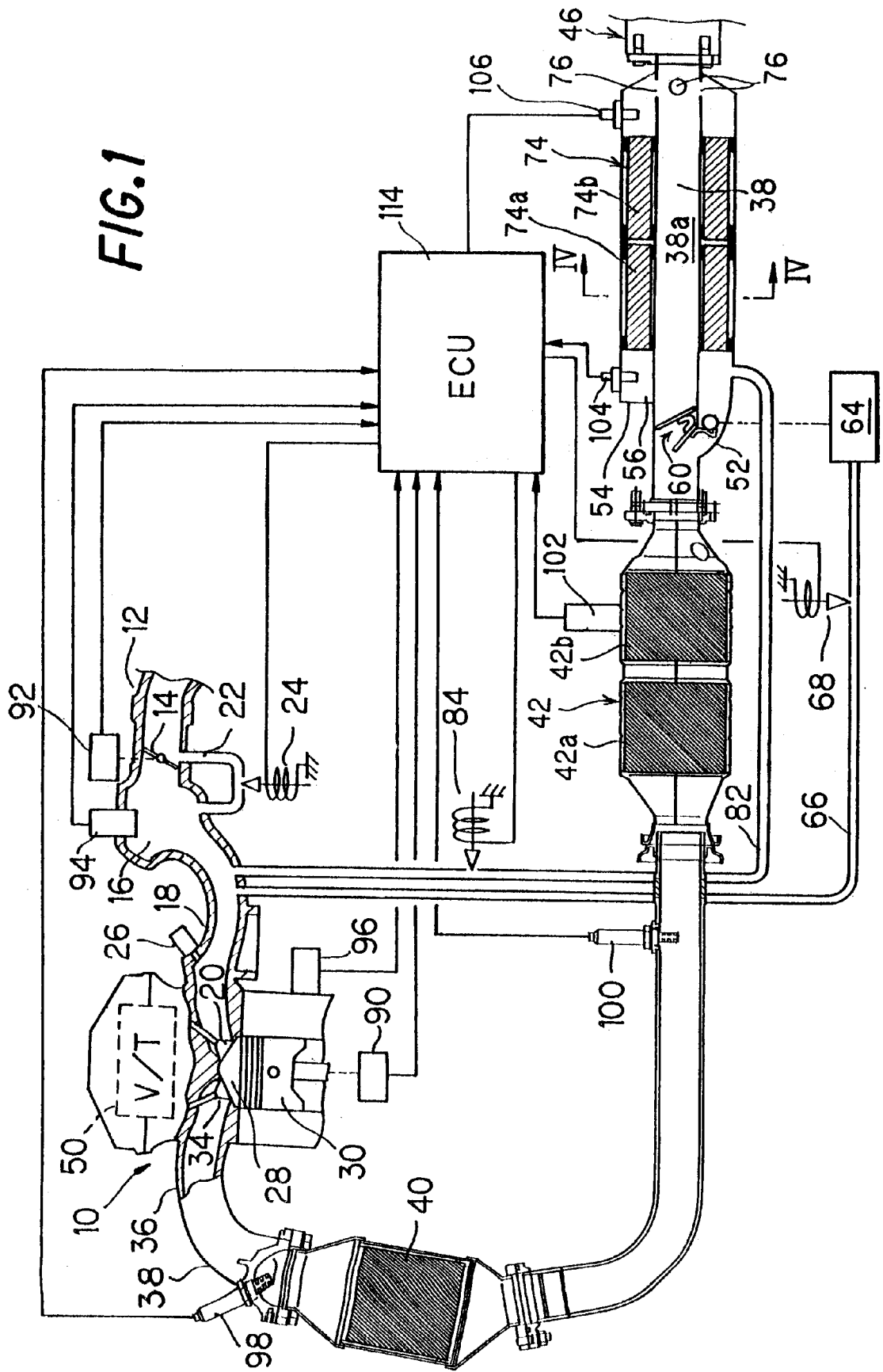
FIG. 1 is a schematic view showing the overall configuration of an exhaust gas purification system of an internal combustion engine according to the invention.

FIG. 1 is a view schematically showing the overall configuration of an exhaust gas purification system of an internal combustion engine according to the invention.

Reference numeral 10 in this figure designates an overhead cam (OHC) in-line four-cylinder internal combustion engine. Air drawn into an air intake pipe or passage 12 through an air cleaner (not shown) mounted separately is supplied to the first to fourth cylinders (only one is shown) through a surge tank 16, an intake manifold 18 and two intake valves 20 (only one is shown), while the flow thereof is adjusted by a throttle valve 14. The throttle valve 14 is bypassed by a bypass 22 provided at the air intake pipe 12. A valve (EACV) 24 comprised of an electromagnetic solenoid valve is installed in the bypass 22 for closing the same.

A fuel injector 26 is installed in the vicinity of the intake valves 20 of each cylinder for injecting fuel into a combustion chamber 28 of the cylinder concerned. The injected fuel mixes with the intake air to form an air-fuel mixture that is supplied into the cylinder chamber and is ignited there by a spark plug (not shown). The resulting combustion of the air-fuel mixture drives a piston 30 downwards.

The exhaust gas produced by the combustion is discharged through two exhaust valves 34 (only one is shown) into an exhaust manifold 36, from where it passes through an exhaust pipe or passage 38 to a first catalyst (catalytic converter) 40 installed immediately below the exhaust manifold 36 and a second catalyst 42 comprising a first catalyst bed 42a and a second catalyst bed 42b (all three-way catalytic converters) where noxious components are removed therefrom before they are discharged into the atmosphere via a vehicle rear assembly 46, including a muffler and a tail pipe (neither shown).

The engine 10 is equipped with a variable valve timing mechanism 50 (illustrated as "VIT" in FIG. 1). The variable valve timing mechanism 50 switches the opening/closing timing of the intake and/or exhaust valves between two types of timing characteristics, a characteristic for low engine speed and a characteristic for high engine speed, in response to the engine speed NE and the manifold absolute pressure PBA. Since this is a well-known mechanism, it will not be described further here.

The exhaust pipe 38 is connected to a chamber 54, cylindrical in shape, at a location downstream of the second catalyst 42. More specifically, the exhaust pipe 38 is branched off downstream of the second catalyst 42 to form a branch 52. The branch 52 is connected to the chamber 54 which is air-tightly connected to the exhaust pipe 38 to surround the same. With this, there are formed, as passages for exhaust gas flow, a main exhaust gas passage 38a passing through the inside of the exhaust pipe 38 and a bypass exhaust gas passage 56 passing through the inside of the branch 52 and the inner space of the chamber 54.

Figure 2:
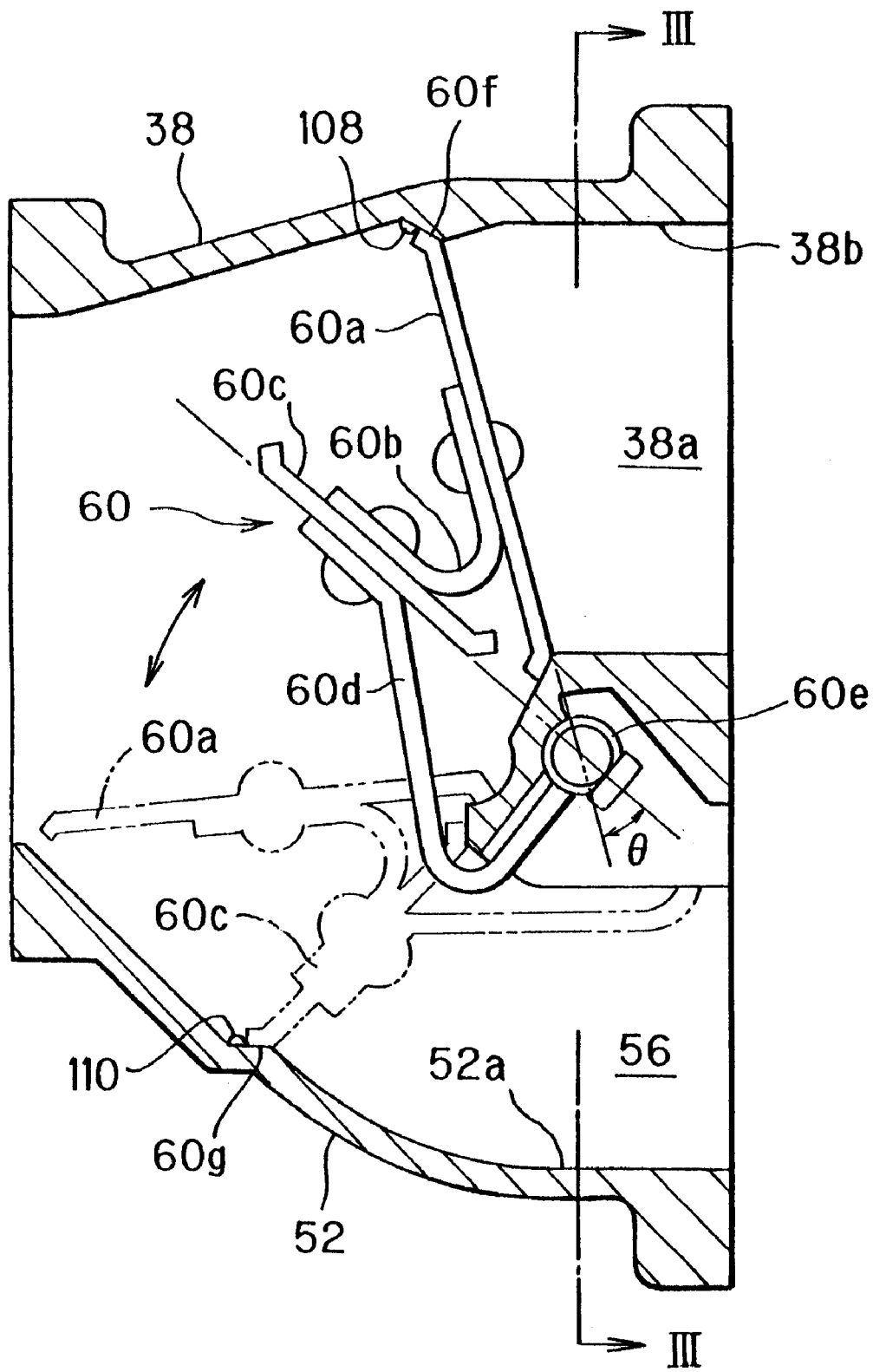
FIG. 2 is an enlarged sectional view of the switch-over valve illustrated in FIG. 1.
Figure 3:
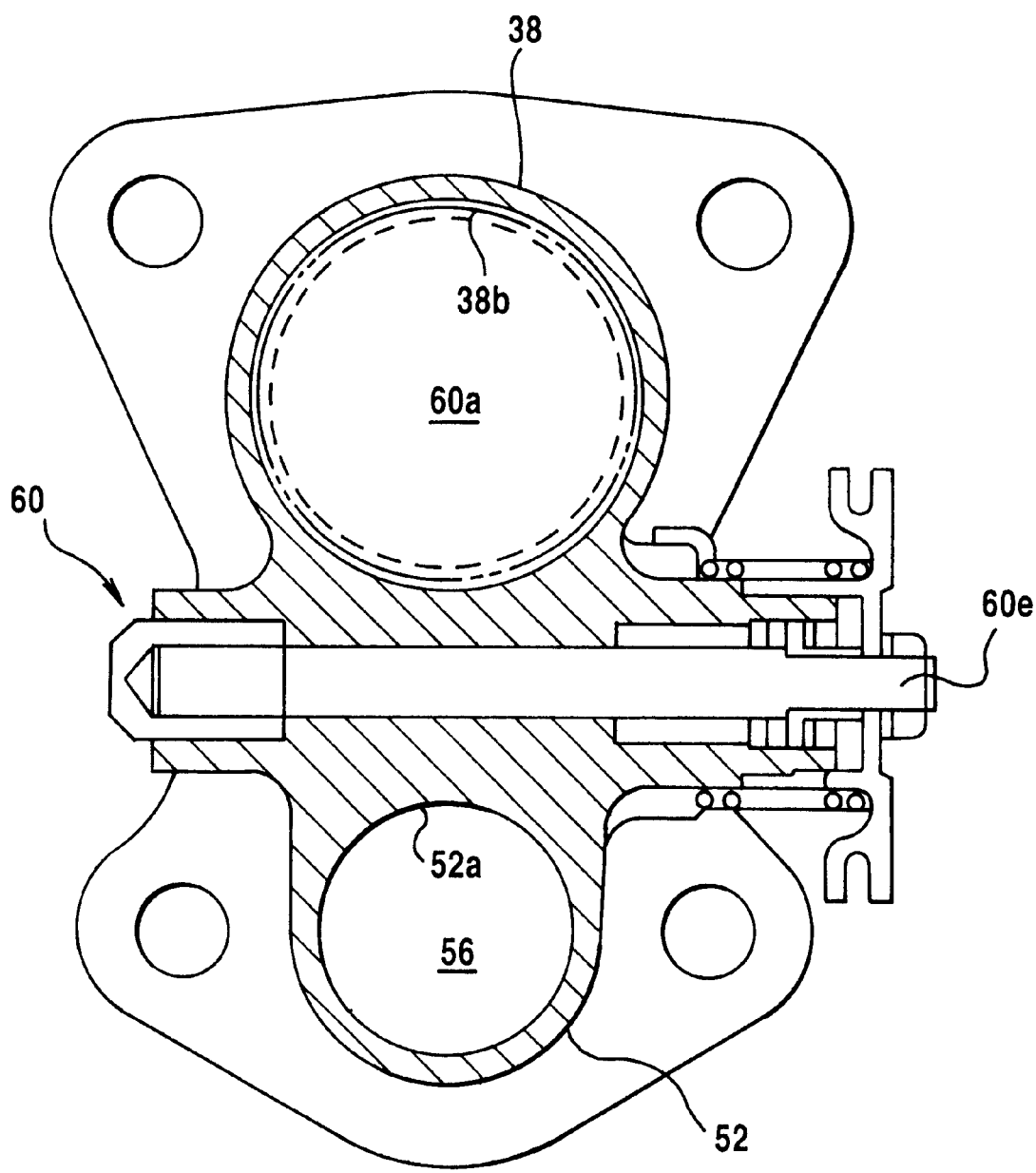
FIG. 3 is a sectional view taken along III—III of FIG. 2.

A switch-over valve (exhaust switch-over valve) 60 is provided in the vicinity of the branching point at the entrance of the chamber 52. FIG. 2 is an enlarged sectional view of the switch-over valve 60 and FIG. 3 is a sectional view taken along III—III of FIG. 2.

The switch-over valve 60 (with reference to FIGS. 2 and 3) comprises a first valve disc 60a which is greater in diameter than the exhaust pipe inner wall 38b defining the main exhaust gas passage 38a, and an arm 60b in an inverted-C shape which connects the first valve disc 60b with a second valve disc 60c which is greater than the diameter of the wall 52a of the branch 52 defining the bypass exhaust gas passage 56. A stem 60d is used to connect the second valve disc 60c to a shaft 60e.

As shown in FIG. 1, the shaft 60e is connected to a valve actuator 64. The valve actuator 64 has a conduit 66 which is connected to the air intake pipe 12 at a location downstream of the throttle valve 14. An electromagnetic solenoid valve (referred later as "TRPV") 68 is installed in the conduit 66, which opens the conduit 66 when energized to introduce a negative pressure therein.

The valve actuator 64 (specifically with reference to FIG. 2) operates to rotate shaft 60e in the position shown by solid lines in the figure when the negative pressure is introduced such that the first valve disc 60a rests on a valve seat 60f to close the main exhaust gas passage 38a (therefore, it opens the bypass exhaust gas passage 56).

However, when the TRPV 68 is deenergized, the conduit 66 is open to the air. As a result, the shaft 60e is returned to a position shown by phantom lines in the figure by a return spring (not shown) such that the second valve disc 60c rests on a valve seat 60g to close the bypass exhaust gas passage 56 (therefore, it opens the main exhaust gas passage 38a).

It should also be noted that the second valve disc 60c (and the first valve disc 60a) can be at any position between those illustrated in the figure by the solid lines and the phantom lines, by regulating the amount of negative pressure introduced in the conduit, by operating the TRPV 68 in such a way that the bypass exhaust gas passage 56 (and the main exhaust gas passage 38a) is opened a slight amount.

The first and second valve discs 60a, 60c (FIG. 2) are fixed to the shaft 60e at a predetermined angle θ in such a way that, when the first valve disc 60a closes the main exhaust gas passage 38a, the second valve disc 60c is lifted from the valve seat 60g so as not to block the exhaust gas flowing into the bypass exhaust gas passage 56, while, when the second valve disc 60c closes the bypass exhaust gas passage 56, the first valve 60a is lifted from the valve seat 60f so as not to block the exhaust gas flowing into the main exhaust gas passage 38a.

As illustrated in FIG. 1, an adsorbent (HC adsorbing means or HC adsorbing catalyst) 74 is installed at the bypass exhaust gas passage 56 in the chamber 54. The adsorbent comprises a first half 74a (provided upstream, i.e., at a position closer to the branch 52) and a second half 74b (provided downstream, i.e., at a position closer to the vehicle rear assembly 46), each carried on a carrier or bed, honey-combed in shape and made of a spiraled thin metal plate.

Figure 4:
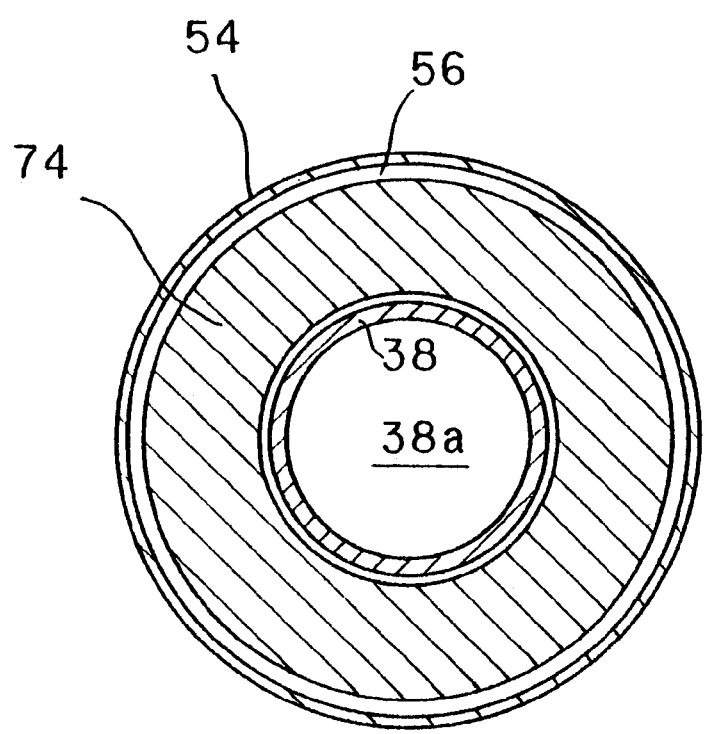
FIG. 4 is a sectional view taken along IV—IV of FIG. 1.

Specifically, as shown in FIG. 4, the chamber 54 is configured to be cylindrical in cross section such that it completely encircles the exhaust pipe 38. More specifically, the adsorbent 74 is positioned close to the exhaust pipe 38 in such a way that the temperature increase of the adsorbent 74 is promoted such that the adsorbed unburned component is desorbed as quickly as possible and is recirculated into the engine intake.

The adsorbent 74 is preferably made from a material comprised of a mixture of crystalline aluminosilicate and a catalyzer element, preferably a mixture of ZSM-5 zeolite and a catalyzer element as is proposed by the assignee in Japanese Laid-Open Patent Application No. Hei 8 (1996)-71,427.

The crystalline aluminosilicate is heat-resistant to a temperature of 900° C. to 1000° C. and exhibits excellent heat-proof properties compared to the active carbon used in the prior art. The adsorbent 74 adsorbs the unburned component such as HC in the exhaust gas under a low ambient temperature, i.e., when the exhaust system temperature is at or below 100° C. and desorbs or releases the captured HC at the exhaust system temperature of 100° C. to 250° C.

The exhaust pipe 38 is provided, at its far end, with four holes 76 which are circumferentially located at intervals of 90 degrees. The bypass exhaust gas passage 56 is thus formed from the branch 52 and extends into the chamber 54 via the adsorbent 74 up to holes 76 (a confluence point) where it merges into the main exhaust gas passage 38a in the exhaust pipe 38.

The chamber is connected, at or near the entrance, i.e., at a position upstream of the adsorbent 74 and close to the branch 52, to an EGR conduit 82. The EGR conduit 82 is connected, at the other end, to the air intake pipe 12 at a position downstream of the throttle valve 14. The EGR conduit 82 is provided with an EGR control valve (electromagnetic solenoid valve) 84 which closes the conduit 82 when made ON (energized).

The ignition distributor (not shown) of the engine 10 is provided with a crank angle sensor 90 which generates a signal indicative of Top Dead Center of the piston 30 and a signal indicative of unit angles divided into smaller values. The engine 10 is further provided with a throttle position sensor 92 which generates a signal indicative of the degree of opening θTH of the throttle valve 14, a manifold absolute pressure (MAP) sensor 94 which generates a signal indicative of the aforesaid manifold absolute pressure PBA of the intake manifold downstream of the throttle valve 14 in terms of absolute value and indicative of the engine load, and a coolant temperature sensor 96 installed in the vicinity of a coolant passage (not shown) of the engine which generates a signal indicative of the temperature TW of the engine coolant.

Further, an universal air/fuel ratio sensor 98 (named LAF sensor) is provided in the exhaust pipe 38 at or downstream of a confluence point of the exhaust manifold 36 and upstream of the first catalyst 40, where it generates a signal indicative of the oxygen concentration in the exhaust gas, as explained later. In addition, an $O_2$ sensor 100 is installed in the exhaust pipe 38 at a location downstream of the first catalyst 40, which generates a signal indicative of the oxygen concentration in the exhaust gas, as explained later.

Furthermore, a temperature sensor 102 is installed in the vicinity of the second catalyst bed 42b of the second catalyst 42 and generates a signal indicative of the temperature of the second catalyst bed 42b, more generally the exhaust gas temperature TCAT in the exhaust system. A temperature sensor 104 is installed at the bypass exhaust gas passage 56 in the chamber 54, more precisely at a location upstream of the first adsorbent half 74a (at a position close to the branch 52), and generates a signal tmp.in indicative of the temperature at the entrance of the bypass exhaust gas passage 56.

Another temperature sensor 106 is installed at the bypass exhaust gas passage 56 in the chamber 54 at a location downstream of the second adsorbent half 74b (at a position close to the vehicle rear assembly 46), and generates a signal tmp.out indicative of the temperature at the exit of the bypass exhaust gas passage 56, therefore the temperature at the confluence point of the bypass exhaust gas passage 56 and the main exhaust gas passage 38a.

Furthermore, as shown in FIG. 2, two limit switches 108, 110 are provided in the vicinity of the valve seats 60f, 60g of the switch-over valve 60 respectively and generate an ON signal when the valve disc 60a (closing the main exhaust gas passage 38a) or the valve disc 60c (closing the bypass exhaust gas passage 56) is driven to rest on the valve seat 60f or the valve seat 60g (or to a position close thereto).

Furthermore, a valve timing sensor (not shown) is provided in a hydraulic pressure circuit (not shown) of the variable valve timing mechanism 50 and generates a signal indicating which characteristic is selected, and a lift sensor (not shown) is provided in the vicinity of the EGR control valve 84 and generates a signal indicative of the amount of lifting or stroke of the EGR control valve 84.

These output signals generated by the sensors are forwarded to an Electronic Control Unit (ECU) 114 comprising a microcomputer.

Figure 5:
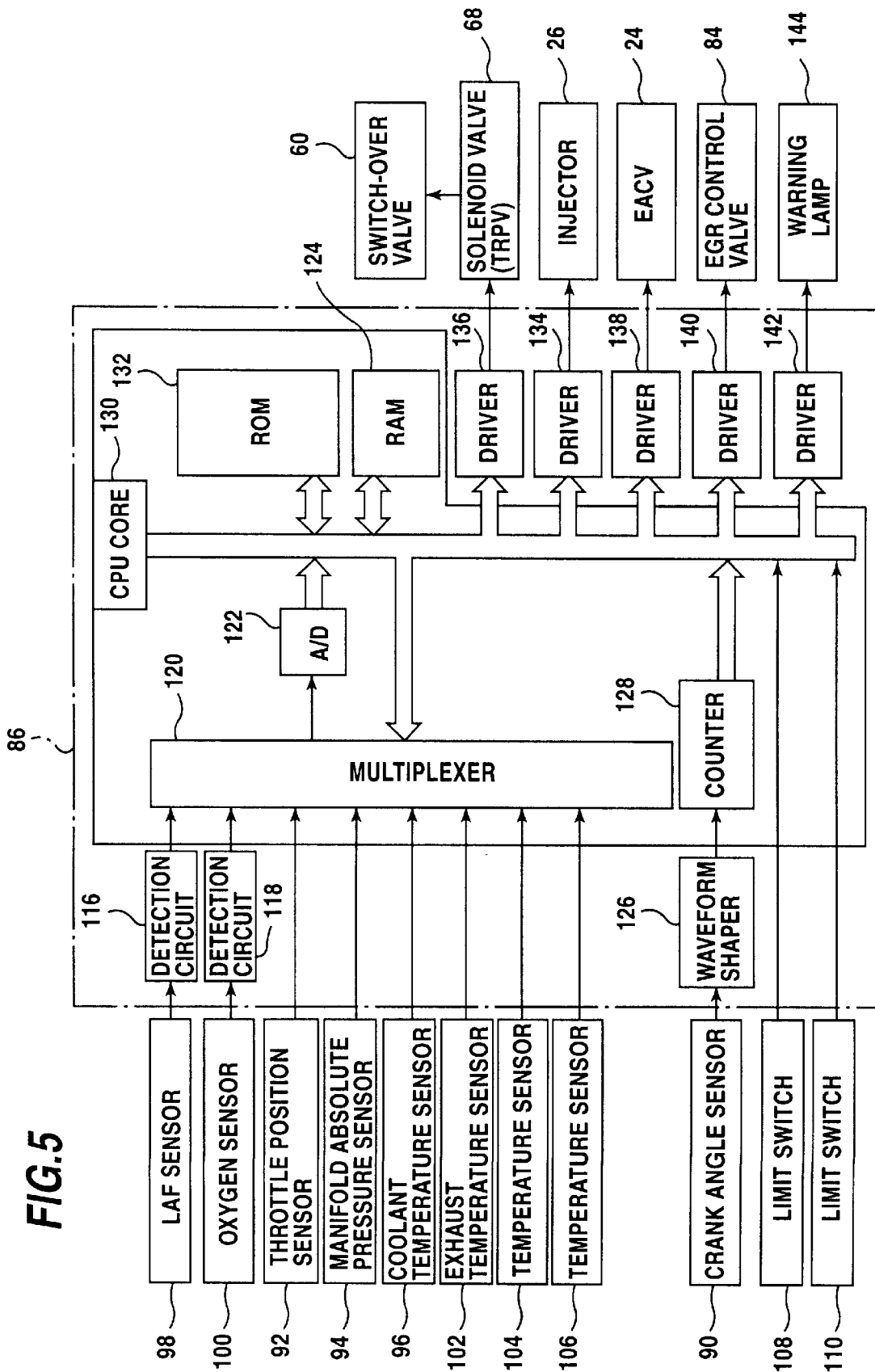
FIG. 5 is a block diagram showing the details of the Electronic Control Unit (ECU) illustrated in FIG. 1.

Details of the ECU 114 are shown in the block diagram of FIG. 5.

The output of the LAF sensor 98 is received by a first detection circuit 116, where it is subjected to appropriate linearization processing for producing an output characterized in that it varies linearly with the oxygen concentration of the exhaust gas over a broad range extending from lean to rich. The output of the $O_2$ sensor 100 is inputted into a second detection circuit 118 which generates a switching signal indicating that the air/fuel ratio in the exhaust gas emitted from the engine 10 is rich or lean with respect to the stoichiometric air/fuel ratio.

The output of the first detection circuit 116 is forwarded through a multiplexer 120 and an A/D converter 122 to a RAM (random access memory) 124 in a CPU (central processing unit) 86. Specifically, the CPU has a CPU core 130, a ROM (read-only memory) 132 and the RAM 124, and the output of the first detection circuit 116 is A/D-converted and stored in buffers of the RAM 124. Similarly, the output of the second detection circuit 118 and the analog outputs of the throttle position sensor 92, etc., are inputted into the CPU through the multiplexer 120 and the A/D converter 122 and stored in the RAM 124.

The output of the crank angle sensor 90 is shaped by a wave-form shaper 126 and has its output value counted by a counter 128. The count is inputted into the CPU and the engine speed NE is detected or calculated from the count. In accordance with commands stored in the ROM 132, the CPU core 130 computes a manipulated variable and drives the fuel injectors 26 of the respective cylinders via a driver 134.

The CPU core 130 also drives, via a driver 136, through the electromagnetic valve (TRPV) 68 and the valve actuator 64 (not shown in FIG. 5) to operate the switch-over valve 60, and the CPU core 130 further conducts controls for reducing noise and for regenerating adsorbent 74, as will be explained later.

Furthermore, the CPU core 130 drives the EACV 24 and the EGR control valve 84 through drivers 138, 140.

Moreover, the CPU core 130 lights a warning lamp (not shown in FIG. 1) 144 through a driver 142.

The mode of operation of the system for noise reduction will be explained.

Figure 6:
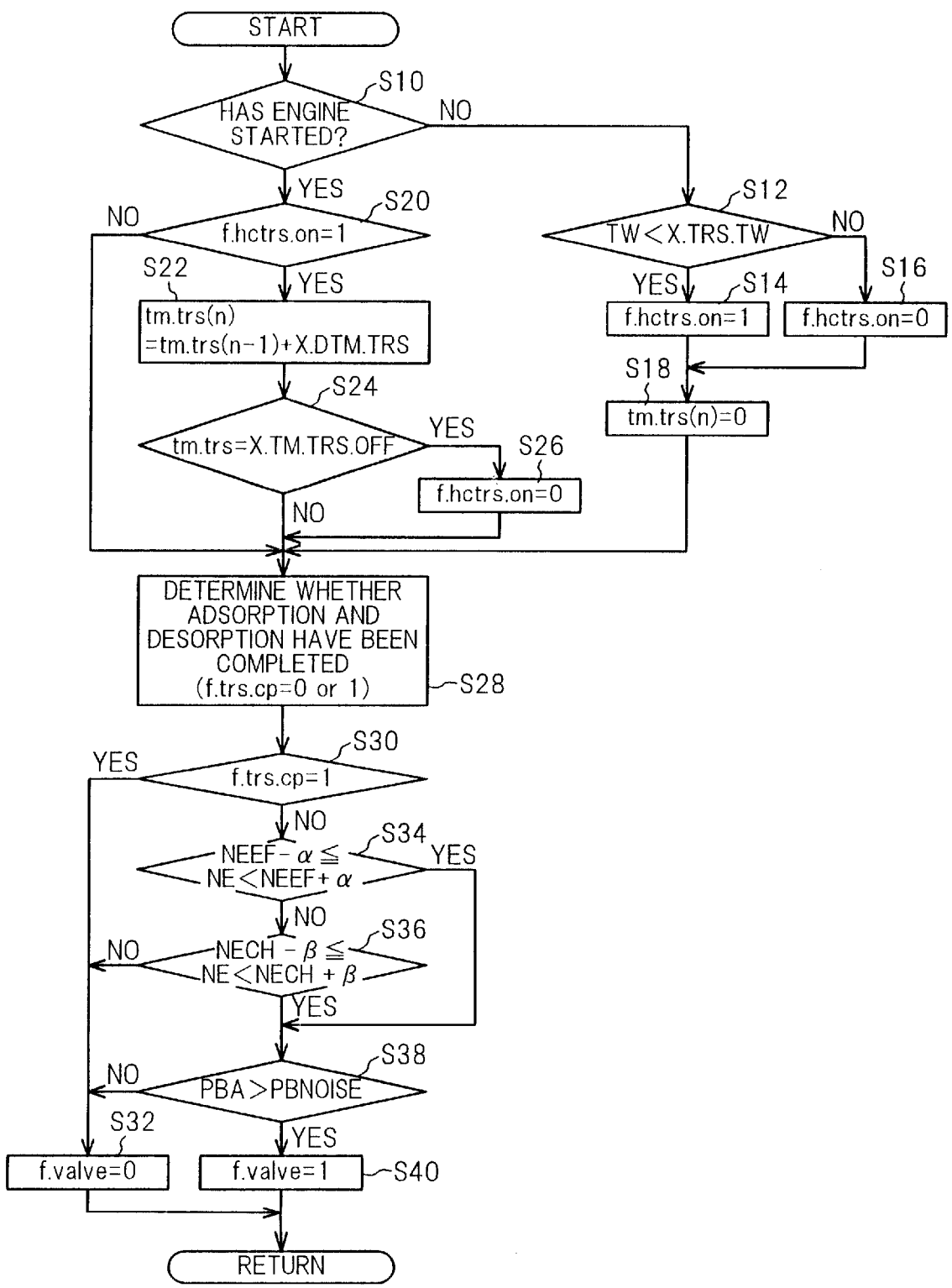
FIG. 6 is a flow chart showing the operation of the system illustrated in FIG. 1.

FIG. 6 is a flow chart showing the operation of the system.

Since the operation of noise reduction is based on the operation of the exhaust gas purification system using the adsorbent 74, before entering into the explanation of the figure, the operation will be described with reference to FIG. 7.

Figure 7A:
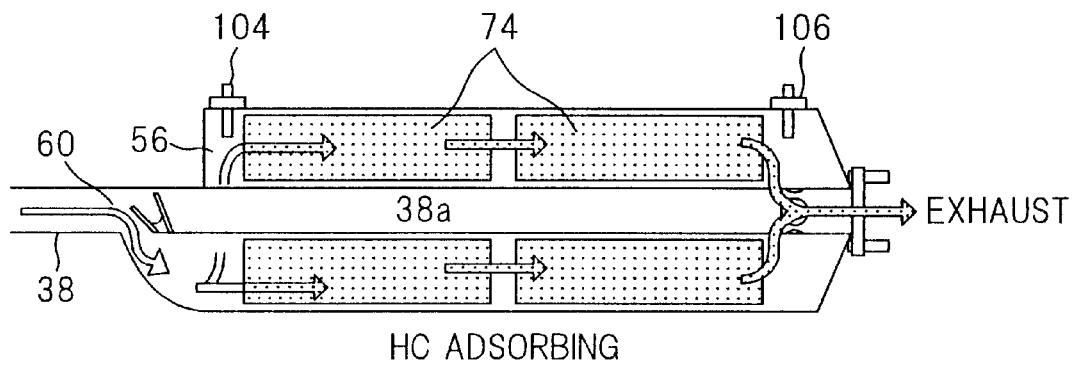
FIGS. 7A, 7B and 7C are explanatory views showing the operation of the exhaust gas purification system illustrated in FIG. 6.

In the exhaust gas purification system illustrated in the figure, when the engine 10 is cold-started, the switch-over valve 60 is kept to the position shown by solid lines in FIG. 2 for a predetermined period of time (e.g., 40 sec.) since the engine starting such that the main exhaust gas passage 38a is closed, while the bypass exhaust gas passage 56 is opened, as illustrated in FIG. 7A.

Since the first and second catalysts 40, 42 provided upstream of the adsorbent 74 have not been activated during the aforesaid period of time when the engine 10 was cold-started, the exhaust gas is not purified by the catalysts 40, 42. The exhaust gas flows through the bypass exhaust gas passage 56, as shown by arrows in FIG. 7A, and the unburned HC component is adsorbed by the adsorbent 74.

Figure 7B:
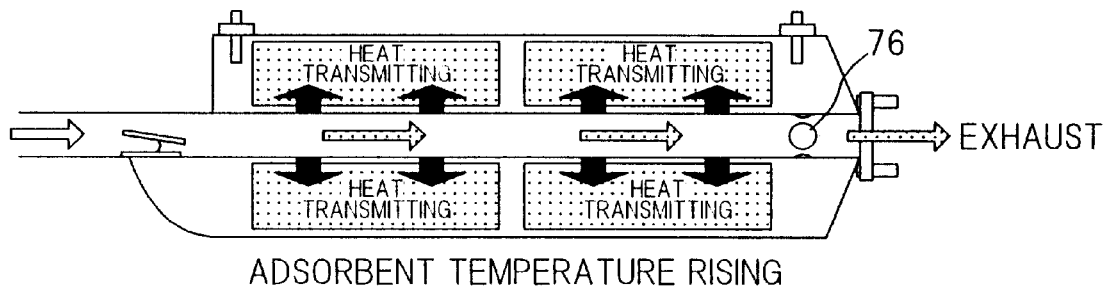

Since the upstream catalysts 40, 42 are normally activated after a lapse of a predetermined period of time, the switch-over valve 60 is driven to the position shown by phantom lines in FIG. 2 such that the main exhaust gas passage 38a is opened, while the bypass exhaust gas passage 56 is closed, as illustrated in FIG. 7B.

Accordingly, the exhaust gas purified by the upstream catalysts 40, 42 flows through the main exhaust gas passage 38a and heats the adsorbent 74. As a result, the unburned HC component adsorbed by the adsorbent 74 begins to desorb. Since the pressure of the exhaust gas flowing through the main exhaust gas passage 38a is greater than that flowing through the bypass exhaust gas passage 56, a part or portion of the exhaust gas enters the bypass exhaust gas passage 56 through the holes 76.

Figure 7C:
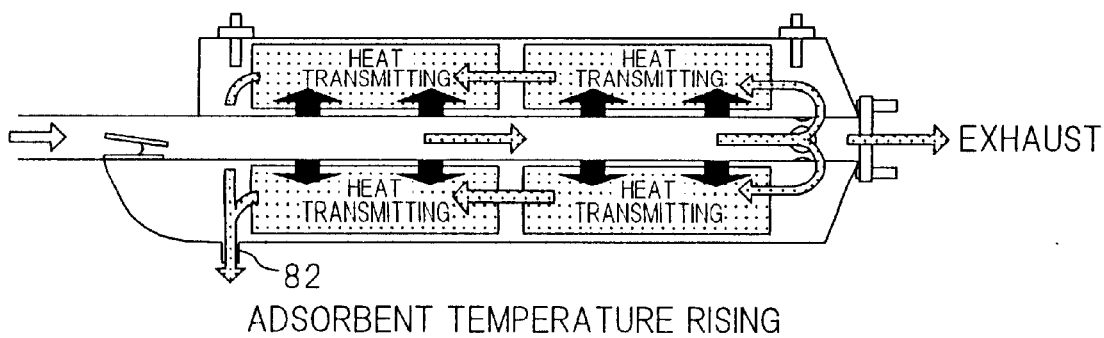

As illustrated in FIG. 7C, the desorbed unburned HC component is recirculated back into the engine intake system through the EGR conduit 82, when the EGR is conducted. At this time, a part or portion of the exhaust gas flowing through the main exhaust gas passage 38a is sucked in by the negative pressure generated at the engine intake system and enters the bypass exhaust gas passage 56 through the holes 76.

The introduced exhaust gas flows through the bypass exhaust gas passage 56 in a direction opposite to that of the exhaust gas flowing through the main exhaust gas passage, while accelerating or expediting the heating of the adsorbent 74, and is recirculated into the engine intake system to be burned once again. The exhaust gas generated by this re-burning is purified by the upstream catalysts 40, 42 and is emitted outside of the engine 10 through the main exhaust gas passage 38a.

In this kind of exhaust gas purification system, in addition to the type disclosed in the figure, other types such as that proposed in the Japanese Laid-Open Patent Application Hei 10 (1998)-159,544 is known, in which the switch-over valve and the EGR conduit are provided downstream, in terms of the ordinary exhaust gas flow, of the bypass exhaust gas passage.

No matter which type the exhaust gas purification system is, it can be schematically simplified as shown in FIG. 8.

Figure 8A:
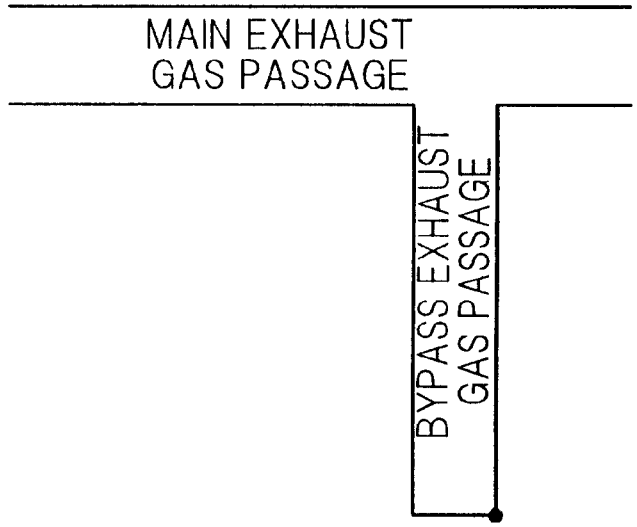
FIGS. 8A and 8B are explanatory views showing the main exhaust gas passage and the bypass exhaust gas passage illustrated in FIG. 1 in a simplified form.
Figure 8B:
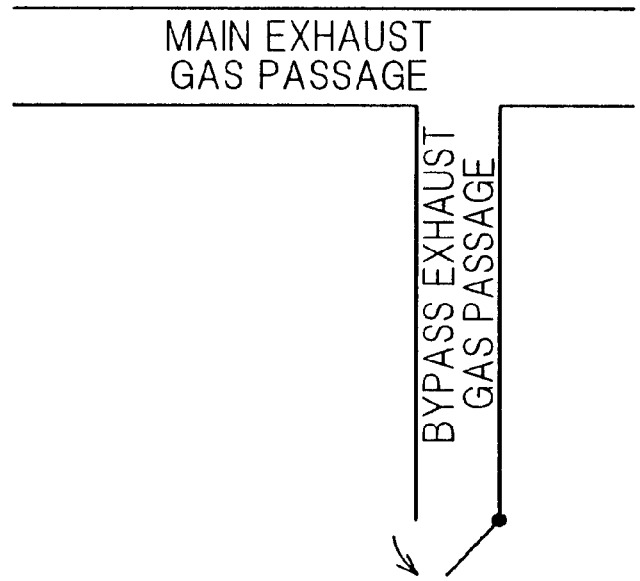

FIG. 8A shows the switch-over valve is operated to close the bypass exhaust gas passage and to open the main exhaust gas passage, while FIG. 8B illustrates the opposite situation.

As mentioned above, when the engine 10 is provided with this kind of exhaust gas purification system, the pulsatory sound may sometimes be amplified by the resonance in the main exhaust gas passage 38a and the bypass exhaust gas passage 56 noise is produced. Since the sound is caused by the opening/closing of the intake valves 20 and the exhaust valves 34, it is a periodic sound which depends on the engine speed NE and the number of engine cylinders. Expressing the number of engine cylinders as Z (=4 in the engine 10 in this embodiment), the sound is a relatively low frequency sound mainly comprising of a basic frequency expressed as follows and its higher harmonics;

$$f=Z \times (NE/60) \times (1/2).$$

Figure 9:
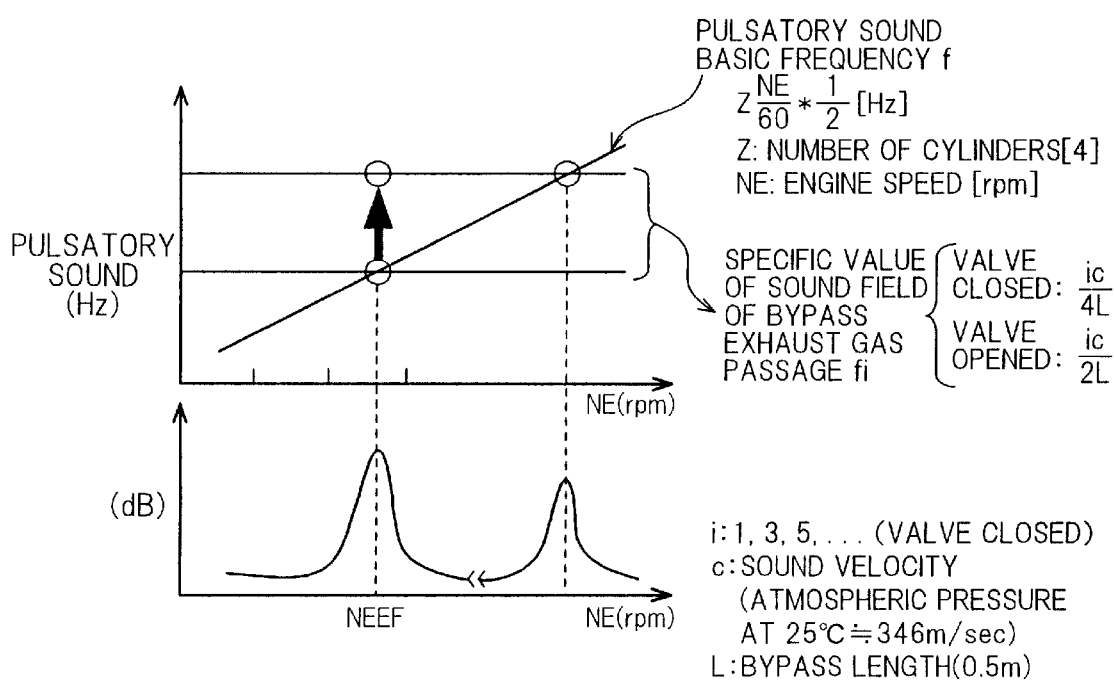
FIG. 9 is an explanatory view showing the relationship between the engine speed and the pulsatory sound amplified by the resonance in the main exhaust gas passage and the bypass exhaust gas passage.

FIG. 9 illustrates the relationship between the pulsatory sound (noise) and the engine speed NE.

Thus, the bypass exhaust gas passage 56 in this embodiment functions as the sound field, more specifically as the one-dimensional sound pipe, its specific value fi (Hz) can be obtained as shown in FIG. 9 based on the following Eqs. (1) and (2). Specifically, when the exhaust gas passage 56 is closed (one end closed and the other end opened), $$ic/4L \quad (1)$$

When the exhaust gas passage 56 is opened (both ends opened), $$ic/2L \quad (2)$$

In the above, i: 1, 3, 5, . . . (in case of Eq. (1), or 1, 2, 3, . . . in case of Eq. (2)); c: sound velocity (under atmospheric pressure at 25° C. which is approximately 346 m/sec); L: the length of the bypass exhaust gas passage 56 (0.5 m in this embodiment). It should be noted that the equations are based on the assumption that the length L of the bypass exhaust gas passage 56 is sufficiently greater than its diameter D (0.03 m in this embodiment).

As will be understood from FIG. 9, the resonance occurs at the points where the pulsatory sound basic frequency f crosses the field sound specific value fi. The pulsatory sound is amplified at the resonance points (5,190 rpm, 15,570 rpm, etc.) and increases to become noise.

In this embodiment, therefore, the noise reduction control is configured in such a way that the switch-over valve 56 is operated to cancel the closing of the bypass exhaust gas passage 56, more specifically, to open the bypass exhaust gas passage 56 by a slight amount to change the specific value of the sound field, thereby preventing the pulsatory sound from being amplified.

It should be noted that, although the specific value of the sound field is thus changed, the resonance point still exists at the next crossing point (e.g., 15,560 rpm). However, since this engine speed is beyond the speed range normally used in the engine 10 in this embodiment, this can be neglected.

It should also be noted that, the reason why it is stated in the above that " . . . is operated to cancel the closing of the bypass exhaust gas passage 56, . . . " is that, it suffices to change the specific value if Eq. (2) is satisfied. For that reason, the switch-over valve 60 need not be rotated to the position (shown by solid lines in FIG. 2) at which the bypass exhaust gas passage 56 is fully opened. Rather, it suffices if the valve 56 is rotated to any position between the fully-opened position and the fully closed position (shown by phantom lines in FIG. 2).

Figure 10:
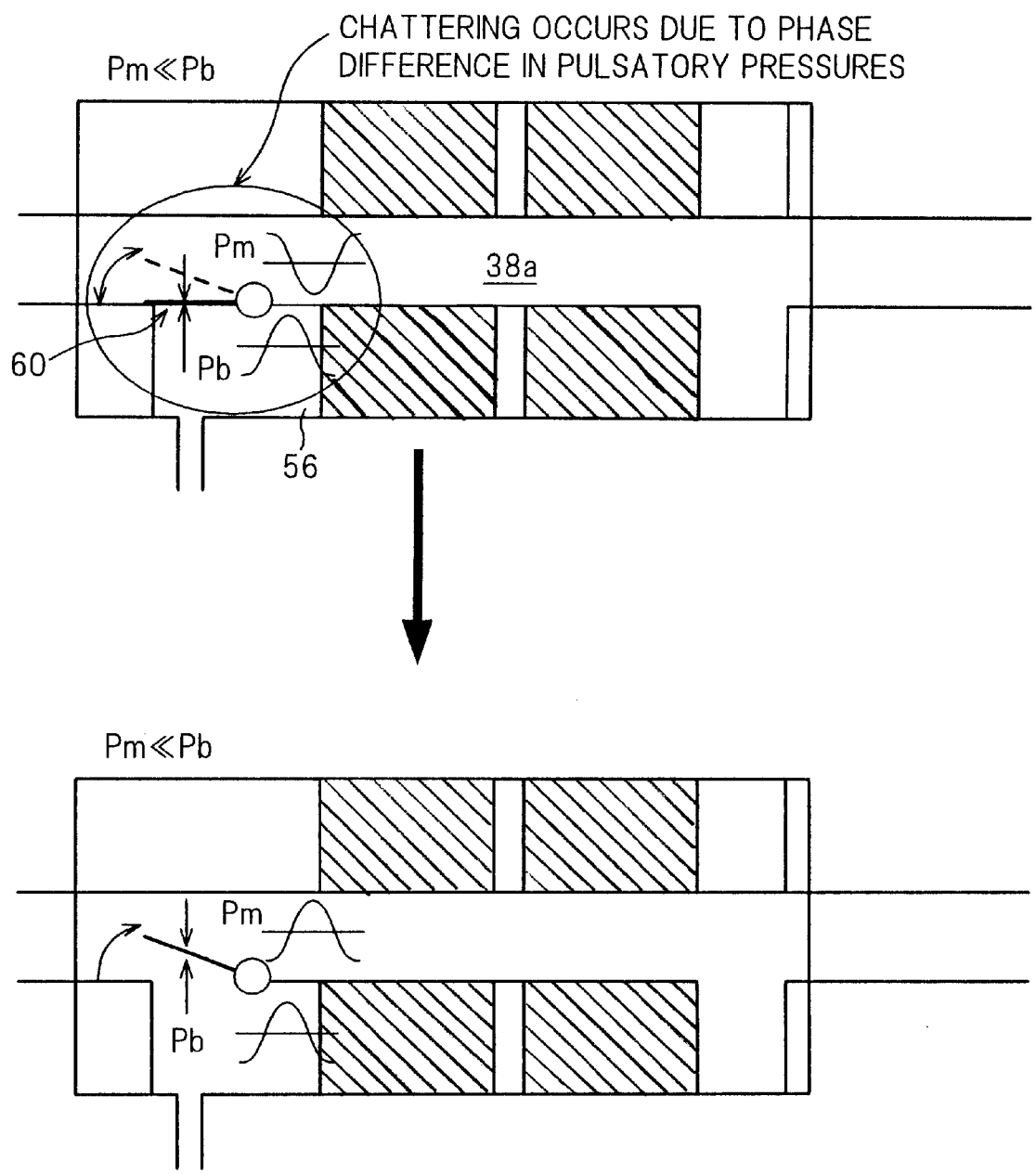
FIG. 10 is an explanatory view showing the reason why the chattering of the switchover valve occurs.

Next, explaining how to reduce noise due to valve chattering, as shown at the top of FIG. 10, the switch-over valve 60 chatters if the valve disc 60a (and the valve 60c) is drawn to the main exhaust gas passage side, when the pulsatory pressure Pa generated in the main exhaust gas passage 38a becomes different in phase from that Pb generated in the bypass exhaust gas passage 56.

Since the engine operating condition which causes this pulsatory pressure difference in phase to occur can be calculated using the engine speed NE, the control to reduce the noise due to valve chattering is configured in a similar manner in such a way that the switch-over valve 56 is operated to cancel closing of the bypass exhaust gas passage 56, more specifically, to open the bypass exhaust gas passage 56 by a slight amount such that the pulsatory pressures are in phase.

Based on the above, the operation of the system will be explained with reference to the flow chart of FIG. 6. The ECU 114 starts operation when the ignition switch is made on and executes the program once every 100 msec.

The program begins at S10 in which it is determined whether the engine 10 has started. This is done by determining whether the engine 10 has started cranking and the fuel injection has started. If the cranking has started, but the fuel injection has not started, it is determined that the engine 10 has not started.

The result in S10 is normally negative in the first program loop and the program proceeds to S12 in which it is determined whether the detected engine coolant temperature TW is less than a predetermined value X.TRS.TW, in other words, it is determined whether the engine 10 has warmed up. It should be noted that, a value or parameter having prefix "X" in this specification and corresponding figures indicates a predetermined value or parameter.

When the result in S12 is affirmative, the program proceeds to S14 in which the bit of the flag h.hctrs.on is set to 1. When the result in S12 is negative, the program proceeds to S16 in which the bit of the flag is reset to 0. To set the bit of the flag to 1 indicates to issue the instruction to operate the switch-over valve 60 such that the bypass exhaust gas passage 56 is opened, while to reset it to 0 indicates to generate the command to operate the valve 60 such that the bypass exhaust gas passage 56 is closed.

In S14, the instruction is generated to operate the switch-over valve 60 to open the bypass exhaust gas passage 56 to begin the HC adsorption. The operation of the switch-over valve 60 itself is conducted in a routine (not shown) by operating the valve actuator 64.

The program proceeds to S18 in which a timer for valve control (up counter) tm.trs(n) is reset to zero. In this specification and figures, the suffix "n" represents a sampling number in the discrete-time system, specifically, the time at which the program of FIG. 6 flow chart is executed, more specifically, (n) indicates the current program-execution-time and (n−1) indicates the preceding program-execution-tine. For brevity, addition of (n) to values at the current time is often omitted.

However, when the result in S10 is affirmative in the next or later program loop, as this means that the engine 10 has started, the program proceeds to S20 in which it is determined whether the flag f.hctrs.on is set to 1, in other words, it is determined whether the engine 10 is cold-started and hence, the HC adsorption is in progress.

When the result in S20 is affirmative, since this means that the bypass exhaust gas passage 56 is opened and the HC adsorption is in progress, the program proceeds to S22 in which the prescribed value X.DTM.TRS is added to the last value tm.trs(n−1) of the timer tm.trs(n) to determine the current timer value tm.trs(n), in other words, the time lapse from the issuance of instruction to open the bypass exhaust gas passage 56 is measured.

The program proceeds to S24 in which it is determined whether the value of the timer tm.trs has reached a predetermined value X.TM.TRS.OFF (e.g., 40 sec), and if the result is affirmative, the program proceeds to S26 in which the bit of the flag f.hctrs.on (instructions to valve operation) is reset to 0. With this, the switch-over valve 60 is operated in another routine to close the bypass exhaust gas passage 56. When the result in S20 is negative, the program skips S22 to S26.

The program then proceeds to S28 in which it is determined whether the aforesaid adsorption and the desorption have been completed. It is determined that the adsorption has been completed when the bit of the aforesaid flag f.hctrs.on is reset to 0.

In regards to the desorption, the determination is made by referring to the bit of a flag which is set/reset in another routine (not shown). Specifically, in the routine (not shown), each time the program is executed, the exhaust gas volume is calculated from the engine speed NE, etc., which is multiplied by an estimated HC concentration to determine an estimated adsorbed HC amount.

Then, when the desorption is determined to begin, each time the program is executed, an estimated quantity of EGR flow is calculated and is multiplied by an estimated quantity of desorbed HC (in the quantity of EGR flow), and the product is subtracted from the estimated adsorbed HC amount. When the estimated adsorbed HC amount has reached zero, the bit of a flag is set to 1 indicating that desorption has been completed. In S28, it is determined whether the desorption has been completed by referring to the bit of this flag. Since this exhaust gas purification control is described in detail in U.S. patent application filed on Jul. 15, 1999 under the Ser. No. 09/354,090, no further explanation is made.

Thus, in S28, it is determined whether the adsorption and the desorption have been completed from the bits of the flag f.hctrs.on and the other flag and when the result is negative, the bit of a flag f.trs.cp is set to 1. When the result is affirmative, the bit of the flag is reset to 0.

Then, the program proceeds to S30 in which it is determined whether the bit of the flag f.trs.cp is set to 1 and if the result is affirmative, since this indicates that the adsorption and the desorption have not been completed, the program proceeds to S32 in which the bit of a flag f.valve is reset to 0. As mentioned above, the operation of the switch-over valve 60 is conducted in the routine (not shown) and to reset the bit of the flag to 0 indicates that the switch-over valve 60 should not be opened (valve closing should not be canceled) such that the opening of the bypass exhaust gas passage 56 should be delayed.

However, when the result in S30 is negative, since this means that the adsorption and the desorption have been completed, the program proceeds to S34 where it is determined whether the detected engine speed NE is within a first range defined by a first predetermined engine speed NEEF±α. The first predetermined engine speed NEEF is the engine speed corresponding to the resonance point shown in FIG. 9 and α is a prescribed value such as 200 rpm. The procedure in S34 determines whether the engine speed is within the range such that the resonance should be suppressed.

When the result in S34 is negative, the program proceeds to S36 in which it is determined whether the detected engine speed NE is within a second range defined by a second predetermined engine speed NECH±β. The second predetermined engine speed NECH is the engine speed which could cause the valve chattering to occur and β is a prescribed value such as 200 rpm. The procedure in S36 determines whether the engine speed is within the range such that the chattering should be suppressed.

When the result in S36 is negative, the program proceeds to S32. When the result in S36 is affirmative (or when the result in S34 is affirmative), the program proceeds to S38 in which it is determined whether the detected manifold absolute pressure PBA (indicative of the engine load) is greater than a predetermined value PBNOISE. The predetermined value PBNOISE is a value indicating that the engine 10 is under high engine load and is, for example, equal to or greater than −300 mmHg (in negative pressure).

When the result in S38 is negative, the program proceeds to S32. When the result in S38 is affirmative, the program proceeds to S40 in which the bit of the flag f.valve is set to 1. The switch-over valve 60 is operated in the other routine from the position shown by phantom lines in FIG. 2 towards the position shown by solid lines by a predetermined amount to open the bypass exhaust gas passage by a degree corresponding to the predetermined amount. As mentioned above, the switch-over valve 60 need not necessarily be rotated to the mechanically-fully opened position.

The reason why the bypass exhaust gas passage is not made open, is that when the engine operation is within the speed range, it could cause chattering or resonance. However it is not within the high engine load region, as the noise due to the chattering or resonance does not increase greatly if the engine load is not high.

In this embodiment, since the bypass exhaust gas passage 56 is opened (closing canceled) when the engine operation is within the engine speed range which could cause the chattering or resonance to happen and is under the high engine load, the system can reduce the noise effectively, while limiting the period of time during which the exhaust gas is introduced into the bypass exhaust gas passage to a necessary and minimum extent such that the period of time during which the adsorbent 74 is exposed to the high temperature exhaust gas is restricted to an necessary and minimum extent.

Moreover, since the opening of the bypass exhaust gas passage 56 is delayed or waits until the adsorption and desorption have been completed, this noise reduction control can surely avoid the interference with the exhaust gas purification control. Thus, the exhaust gas purification control is not affected by this noise reduction control.

It should be noted in the above, although the adsorbent is installed at the bypass exhaust gas passage, the embodiment should not be limited to this. Instead of the adsorbent, a light-off catalyst with an electric heater such as disclosed in Japanese Laid-Open Patent Application No. Hei 9 (1997)-72, 210 can instead be installed there.

Figure 11:
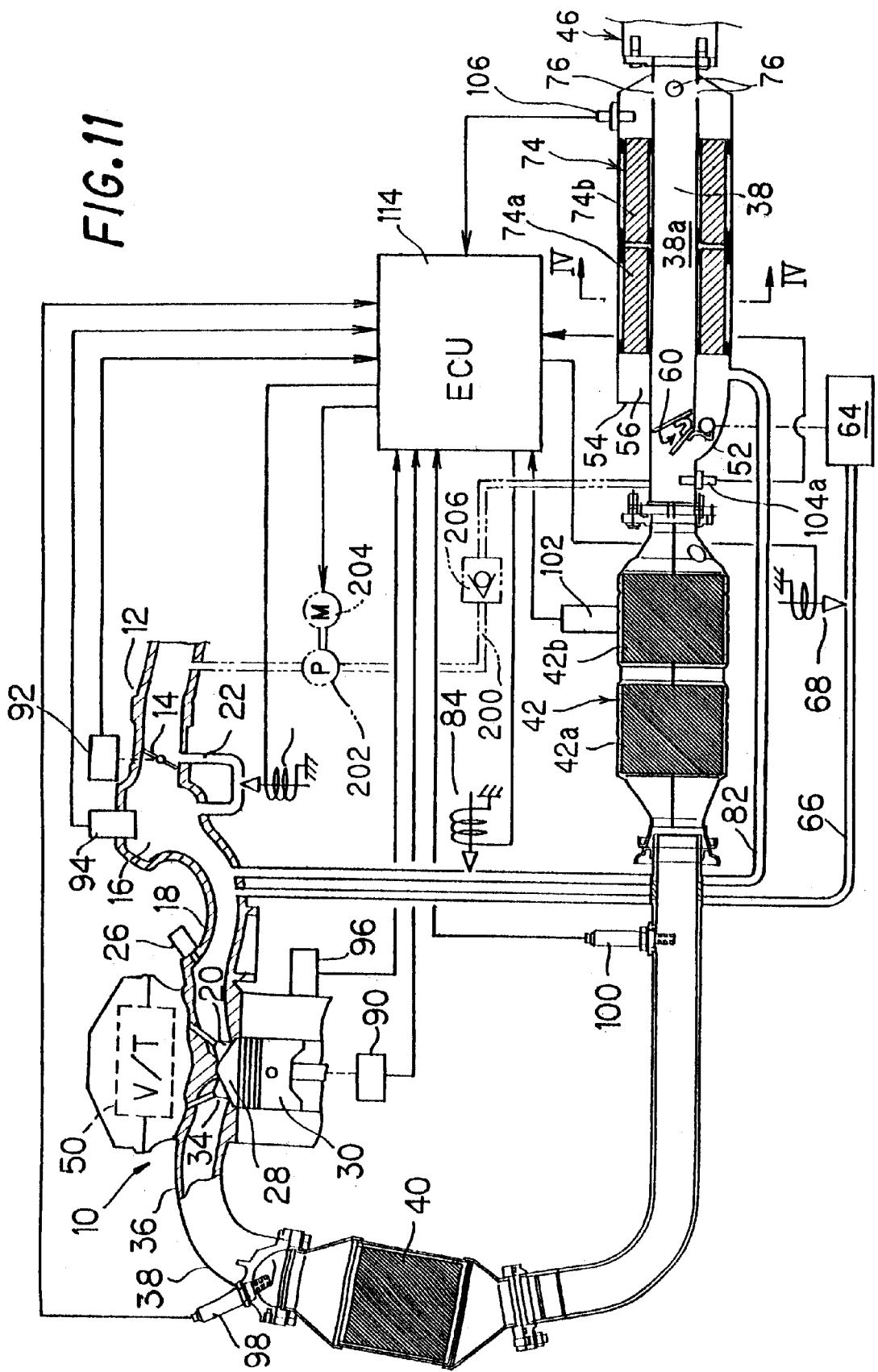
FIG. 11 is a view, similar to FIG. 1, but showing the overall configuration of an exhaust gas purification system of an internal combustion engine according to the second embodiment of the invention.

FIG. 11 is a view, similar to FIG. 1, but showing the overall configuration of the exhaust gas purification system of an internal combustion engine according to the second embodiment of the invention.

The second embodiment aims to provide an exhaust gas purification system of an internal combustion engine, which detects the exhaust gas temperature and when the detected exhaust gas temperature is greater or equal to a predetermined temperature, similarly operates the switch-over valve 60 to open the bypass exhaust gas passage 56 and introduces the exhaust gas to burn away the cloggy material from the adsorbent 74, thereby regenerating the adsorbent to a satisfactory extent.

The following text explains the second embodiment, emphasising the difference from the first embodiment. In the system according to the second embodiment, the first temperature sensor 104 is removed and another temperature sensor 104a is installed outside of the chamber 54 at a location downstream of the second catalyst bed 42b and upstream of the chamber 54 to generate a signal indicative of the exhaust gas temperature to be supplied to the adsorbent 74 in the bypass exhaust gas passage. The temperature is named tmp.fr.trs and is hereinafter referred to as "fore-adsorbent temperature".

Figure 12:
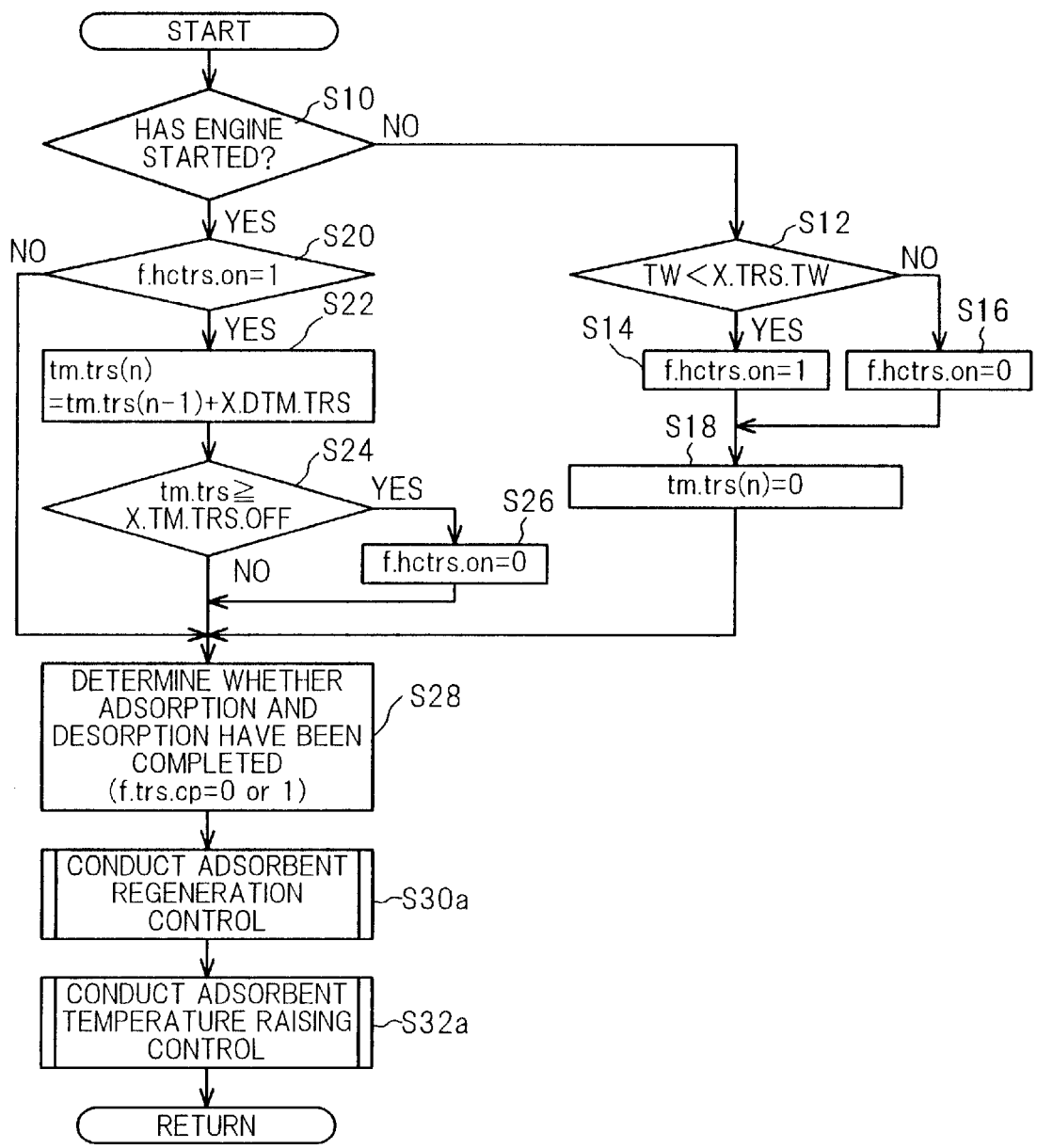
FIG. 12 is a view, similar to FIG. 6, but showing the operation of the system according to the second embodiment of the invention.

FIG. 12 is a flow chart showing the operation of the system according to the second embodiment.

Figure 13A:
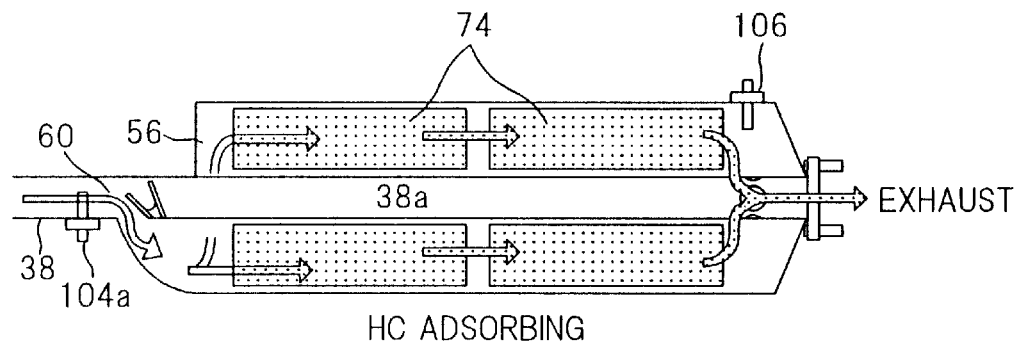
FIGS. 13A, 13B, 13C, and 13D are views, similar to FIGS. 7A, 7B and 7C, but showing the operation of the system according to the second embodiment of the invention.
Figure 13B:
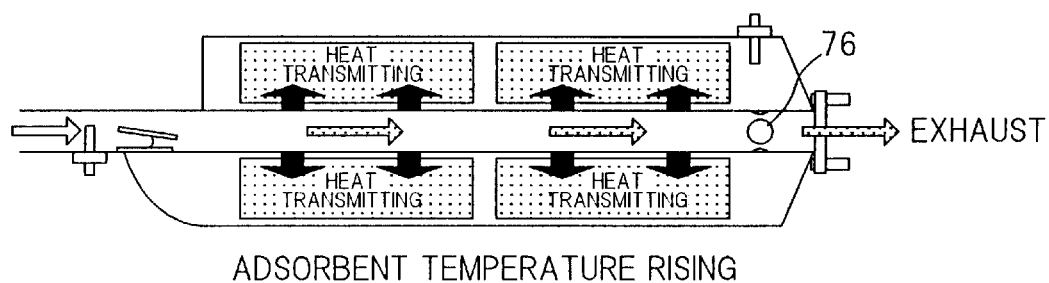
Figure 13C:
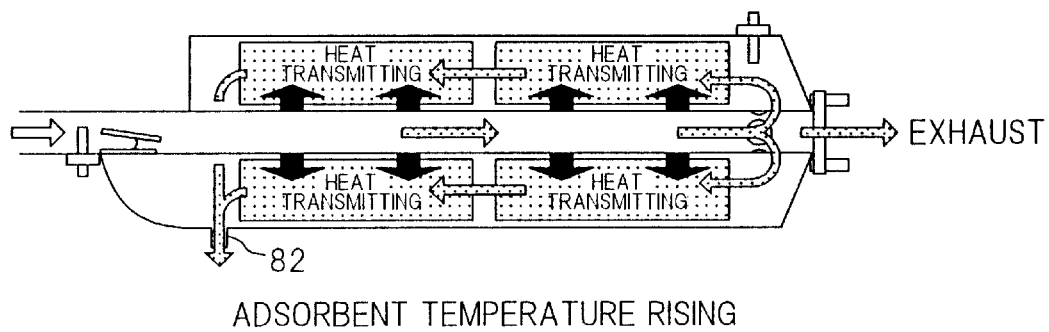

The operation is similarly based on the operation of the exhaust gas purification system using the adsorbent 74 and the adsorption and the desorption are conducted as illustrated in FIGS. 13A to 13C. The exhaust gas generated by this re-burning is purified by the upstream catalysts 40, 42 and is emitted outside of the engine 10 through the main exhaust gas passage 38a.

As mentioned previously, cloggy material such as soot adheres to the adsorbent as the repetition of the exhaust gas purification increases and clogs the adsorbent. This deteriorates and degrades the performance of the adsorbent.

Figure 13D:
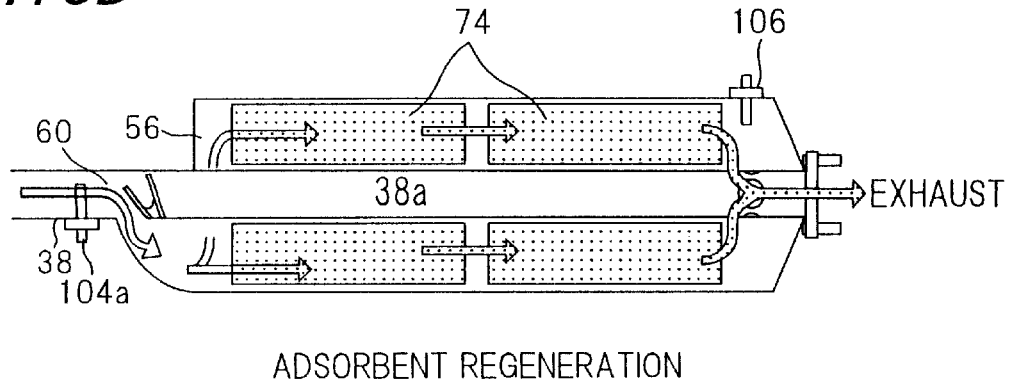

In view of the above, the system is configured to again open the bypass exhaust gas passage 56 to introduce the exhaust gas, as shown in FIG. 13D, when the fore-adsorbent temperature tmp.fr.trs is greater or equal to a predetermined temperature to burn away the cloggy material from the adsorbent and regenerate the adsorbent 74.

Based on the above, the operation of the system will be explained with reference to the flow chart of FIG. 12. The ECU 114 starts operation when the ignition switch is made on and executes the program once every 100 msec.

The program begins at S10 and proceeds to S28 in a manner similar to the first embodiment, and proceeds to S32a where the adsorbent regeneration control is conducted.

Figure 14:
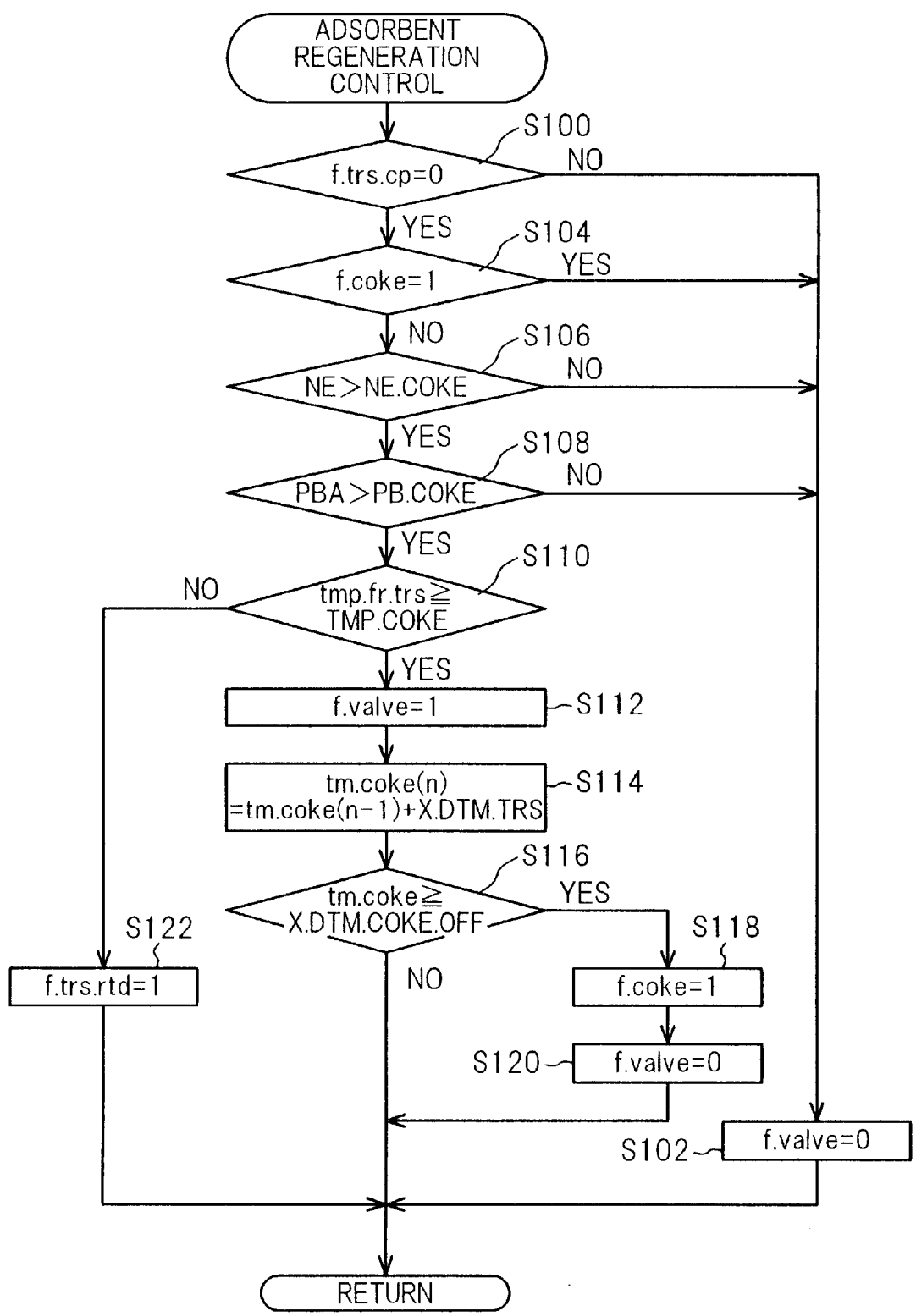
FIG. 14 is a flow chart showing the subroutine of adsorbent regeneration control referred to in the flow chart of FIG. 12.

FIG. 14 is a flow chart showing the subroutine for this determination.

The program begins at S100 where the bit of the aforesaid flag f.trs.cp is reset to zero. When the result is negative, since this means that the adsorption and the desorption have not been completed, the program proceeds to S102 in which the bit of the flag f.valve is reset to 0. With this, the bypass exhaust gas passage 56 is kept closed in the other routine.

When the result in S100 is affirmative, the program proceeds to S104 where it is determined whether the bit of a flag f.coke is set to 1. Since the bit of the flag is set to 1 when the regeneration has been completed as will be explained later, the result in S104 is normally negative and the program proceeds to S106 where it is determined whether the detected engine speed NE is greater than a predetermined engine speed NE.COKE.

The predetermined engine speed NE.COKE is determined through experimentation at a high engine speed (e.g., 2000 rpm) which can supply the high temperature exhaust gas to promote the burning of the cloggy material.

When the result in S106 is negative, the program proceeds to S102. On the other hand, when the result in S106 is affirmative, the program proceeds to S108 where it is determined whether the detected manifold absolute pressure (engine load) PBA is greater than a predetermined engine load PB.COKE.

The predetermined engine load NE.COKE is determined through experimentation at a high engine speed (e.g., 2000 rpm) which can supply the high temperature exhaust gas to promote the burning of the cloggy material.

When the result in S108 is negative, the program proceeds to S102. However, when the result in S108 is affirmative, the program proceeds to S102 where it is determined whether the detected fore-adsorbent temperature tmp.fr.trs is greater than a predetermined temperature TMP.COKE.

Since the temperature of the adsorbent 74 should preferably be raised to a value higher than the temperature for desorption in order to remove the cloggy material from the adsorbent 74, the predetermined temperature TMP.COKE is set to a value such as 600° C.

When the result in S110 is affirmative, since the conditions for adsorbent regeneration are met, the program proceeds to S112 where the bit of the flag f.valve is set to 1. The switch-over valve 60 is operated in the other routine to close the bypass exhaust gas passage 56 to a predetermined degree.

Then, the program proceeds to S114 where the prescribed value X.DTM.TRS is added to the value of a timer tm.coke (initially zero) to start time measurement, and to S116 where it is determined whether the timer value is greater or equal to a predetermined value (time) X.DTM.COKE.OFF.

The predetermined value (time) X.DTM.COKE.OFF is determined based on the engine operating conditions (such as the exhaust gas temperature, the engine speed NE, the manifold absolute pressure PBA, the amount of fuel injection), the environmental conditions (such as the temperature outside the engine 10, the atmospheric pressure), and the degree of degradation of the adsorbent 74, etc., and is variable. For example, it is 60 sec or thereabout.

When the result in S116 is negative, the program is immediately terminated. On the other hand, when the result in S116 is affirmative, since this means that the burning of the cloggy material has been completed, the program proceeds to S118 where the bit of the flag is set to 1, to S120 where the bit of the flag f.valve is reset to 0. With this, the switch-over valve 60 is operated to close the bypass exhaust gas passage 56.

When the result in S110 is negative, the program proceeds to S122 where the bit of a flag f.trs.rtd. is set to 1. With this, the control to raise the temperature of the adsorbent 74 is conducted, which will be explained below.

As shown in FIG. 6, the program proceeds to S32 where the adsorbent temperature raising control is conducted.

Figure 15:
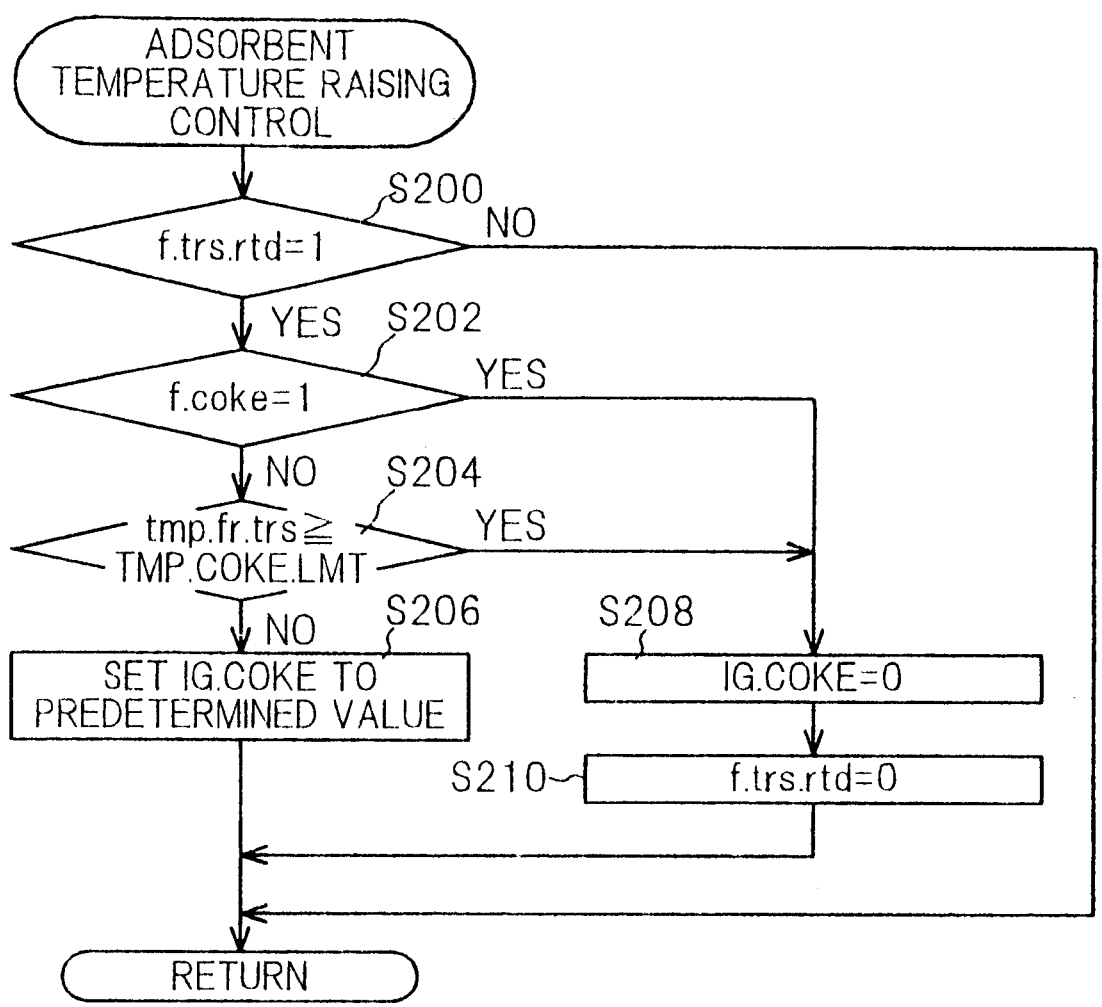
FIG. 15 is a flow chart showing the subroutine of adsorbent temperature raising control referred to in the flow chart of FIG. 12.

FIG. 15 is a flow chart showing the subroutine of this.

The program begins at S200 where it is determined whether the bit of the aforesaid flag f.trs.rtd is set to 1. When the result is negative, since no adsorbent temperature raising control is needed, the program is immediately terminated.

However, when the result in S200 is affirmative, the program proceeds to S202 where it is determined whether the bit of the flag f.coke is set to 1. When the result is negative, since this indicates the regeneration has not been completed, the program proceeds to S204 where it is determined whether the fore-adsorbent temperature tmp.fr.trs is greater or equal to a second predetermined temperature TMP.COKE.LMT.

The predetermined temperature TMP.COKE.LMT indicates an upper limit of adsorbent temperature raising control and is set to a value (e.g., 650° C.) higher than the aforesaid predetermined value TMP.COKE, so as to prevent the control hunting from occurring with the procedure in S110.

When the result in S204 is negative, the program proceeds to S206 in which an ignition timing correction amount IG.COKE is set to a predetermined value (fixed value). Specifically, this adsorbent temperature raising control is conducted by retarding the ignition timing. The ignition timing IGLOG is determined as follows.

IGLOG=IGMAP+IGCR+IG.COKE wherein, IGLOG: output ignition timing; IGMAP: basic ignition timing obtained by retrieving mapped data using the engine speed NE and manifold absolute pressure PBA as address data; IGCR: correction amounts determined based on the engine coolant temperature TW, etc., in plus values (i.e., correction in retarding direction) and minus values (i.e., correction in advancing direction); and IG.COKE: correction amount for adsorbent temperature raising in a plus value (i.e., correction in retarding direction). In the above equation, the sign+indicates increase in the ignition timing retarding direction.

However, when the result in S202 is affirmative, the program proceeds to S208 where the ignition timing correction amount IG.COKE is set to zero, and to S210 where the bit of the flag f.trs.rtd is reset to 0. The adsorbent temperature raising control is terminated. This will be the same when the result in S204 is affirmative, since it is not desirable for the first and second catalysts 40, 42 to raise the exhaust gas temperature unnecessarily.

Thus, when the results in S110 (in FIG. 14) and in S204 (in FIG. 15) are negative, each time the program of FIG. 12 flow chart is executed, the output ignition timing IGLOG is gradually corrected in the retarding direction by the amount IG.COKE (if the other values remain unchanged). With this, the phase of combustion is delayed and the exhaust gas temperature is continually raised.

As a result, even if it is determined that the fore-adsorbent temperature is less than the predetermined temperature TMP.COKE, the determination in this step will be affirmative in due course and then the program proceeds to S112 where the bypass exhaust gas passage 56 is opened to burn away the cloggy material until the value of timer tm.coke becomes greater or equal to the predetermined time X.DTM.COKE.OFF.

Moreover, since the value of the timer tm.coke is not reset, if the cloggy material burning is started, but discontinues due to a temperature drop and resumes when the conditions are again met, the time measurement resumes from the held timer value. With this, the regeneration will not continue for an unnecessary long period of time.

Thus, in the system according to the second embodiment, the high engine speed and high engine load region where the exhaust gas temperature (i.e., the fore-adsorbent temperature tmp.fr.trs) supplied to the adsorbent 74 rises, is used to conduct the regeneration and before conducting the control, the fore-adsorbent temperature is detected to determine whether the exhaust gas introduction should be made. With this, the system can regenerate the adsorbent 74 at the region suitable, in fact, for the purpose, in an effective manner as desired Moreover, since the ignition timing is retarded to raise the exhaust gas temperature if the fore-adsorbent temperature tmp.fr.trs is less than the predetermined temperature. With this, once the desorption has been completed and when the engine operation enters the high engine speed and high engine load region for regeneration, the control can be conducted. Accordingly, if the cloggy material adheres to the adsorbent 74, it can immediately be removed.

Moreover, since the time X.DTM.COKE.OFF during which the regeneration is conducted, is determined variably in response to the engine operating conditions, etc., the control will not be continued for an unnecessary long period.

Figure 16:
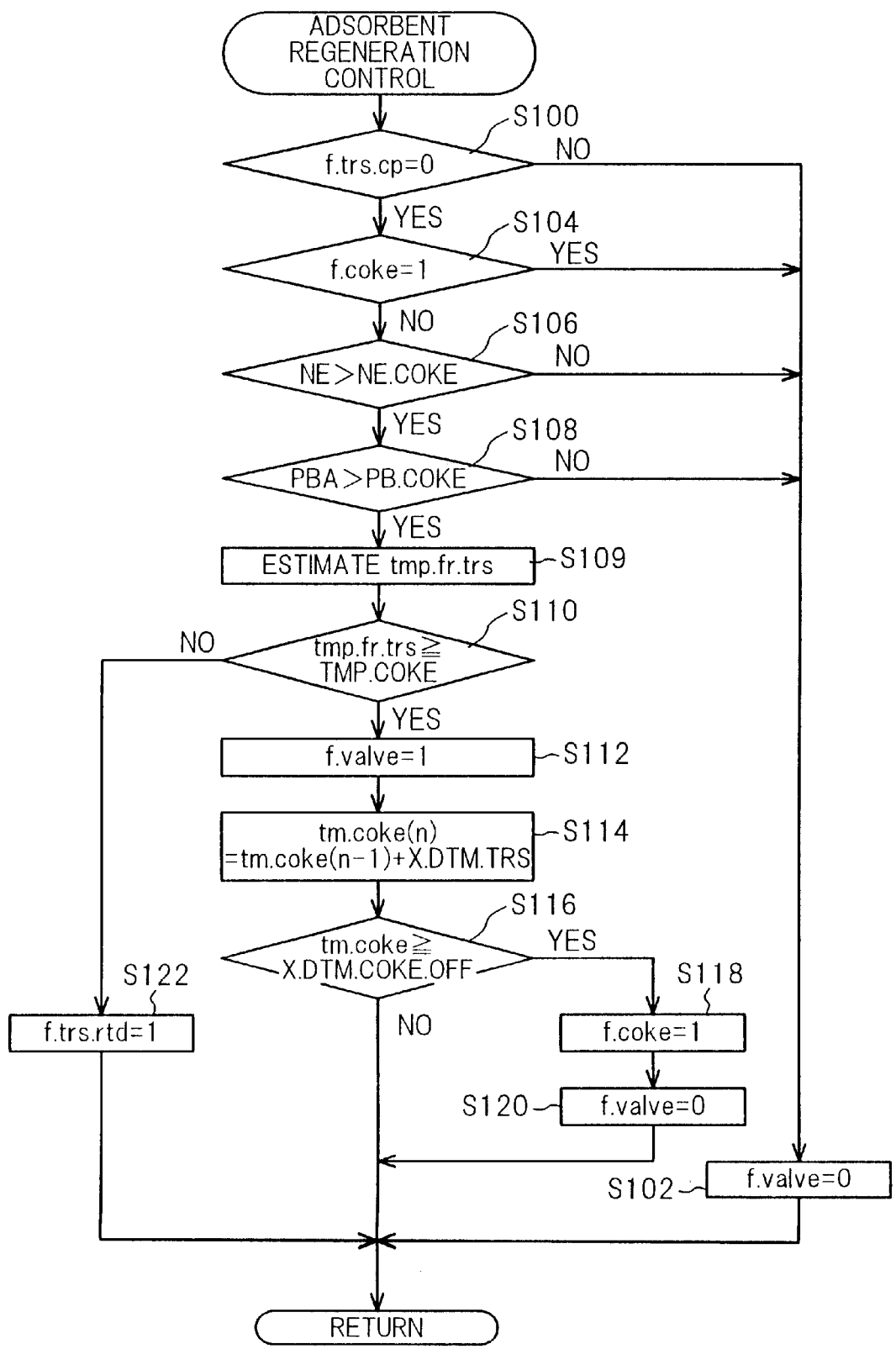
FIG. 16 is a view, similar to FIG. 14, but showing the operation of an exhaust gas purification system of an internal combustion engine according to the third embodiment of the invention.

FIG. 16 is a flow chart, similar to FIG. 14, but showing the operation of an exhaust gas purification system of an internal combustion engine according to a third embodiment of the invention.

Explaining the third embodiment while putting an emphasis on the difference from the second embodiment, in the third embodiment, after S108, S109 is added in which the fore-adsorbent temperature tmp.fr.trs is estimated. Specifically, the temperature sensor 104a is removed and the fore-adsorbent temperature tmp.fr.trs is obtained through an algorithm.

More specifically, appropriate characteristics of the fore-adsorbent temperature have been obtained through experimentation based on the engine operating conditions (such as the exhaust gas temperature, the engine speed NE, the manifold absolute pressure PBA, the amount of fuel injection), and the environmental conditions (such as the temperature outside the engine 10, the atmospheric pressure), etc., and are prepared as mapped data such that the fore-adsorbent temperature can be retrieved therefrom suing the parameters mentioned above.

This is because the fore-adsorbent temperature tmp.fr.trs need not necessarily be precise. Rather, it suffices if the temperature may be a high temperature which can promote the burning of the cloggy material.

It should be noted that another technique for estimating the catalyst temperature proposed by the assignee in the U.S. patent application filed on Aug. 13, 1998 under the Ser. No. 09/133,317, may instead be used.

In the third embodiment, thus, the estimated value will be used in S110 (in FIG. 16) and a step (not shown) corresponding to S204 (in FIG. 15).

Having been configured in the foregoing manner, the system according to the third embodiment is simpler in configuration when compared to the second embodiment. The rest of the configuration and the effects and advantageous thereof are the same as those of the second embodiment.

Figure 17:
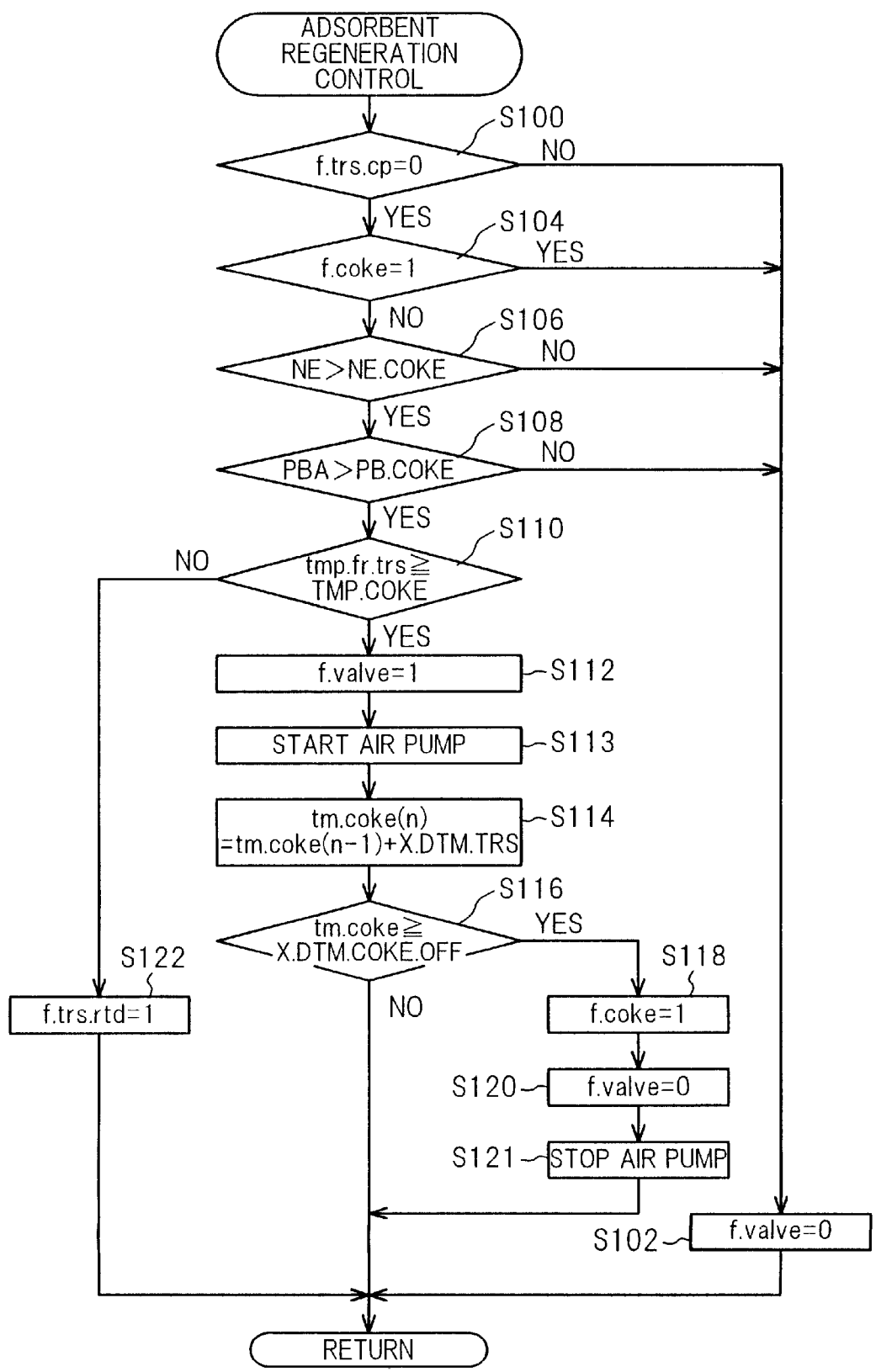
FIG. 17 is a view, similar to FIG. 14, but showing the operation of an exhaust gas purification system of an internal combustion engine according to the fourth embodiment of the invention.

FIG. 17 is a flow chart, similar to FIG. 14, but showing the operation of an exhaust gas purification system of an internal combustion engine according to a fourth embodiment of the invention.

In the fourth embodiment, as shown by phantom lines in FIG. 11, the exhaust pipe 38 is connected, at a position upstream of the location of the switch-over valve 54, to the air intake pipe downstream of the throttle valve 14 through a pipe or passage 200 and an air pump 202 is installed at the pipe 200.

The air pump 202 is connected to an electric motor 204 which is electrically connected to the ECU 114 via a driver (not shown) in such a manner that, when the motor 204 is operated, the air pump 202 is operated to supply the intake air to the exhaust pipe 38. When the motor 204 is stopped, the air pump 202 becomes inoperative and stops the air supply to the exhaust pipe 38. A check valve 206 is installed at the pipe 200 to prevent the exhaust gas from flowing towards the air intake system.

Explaining the operation of the fourth embodiment with reference to FIG. 17, in S113 (after S112) in which the air pump 202 is started (operated) and in S121 (after S120) in which the air pump 202 is stopped.

Specifically, after the switch-over valve 60 is operated to open the bypass exhaust gas passage 60, the program proceeds to S113 in which the motor 204 is started (operated) to operate the air pump 202 to supply the intake air so as to increase the oxygen concentration in the bypass exhaust gas passage 56. With this, the adsorbent 74 is supplied with a high temperature exhaust gas containing surplus oxygen which promotes the burning of the cloggy material, thereby removing the cloggy material from the adsorbent in a more effective manner.

In the flow chart, when the switch-over valve 60 is operated to close the bypass exhaust gas passage 56, since the supply of air is no longer needed, the program proceeds to S121 where the air pump 202 is made inoperative.

Having been configured in the foregoing manner, the system according to the fourth embodiment can regenerate the adsorbent 74 more effectively. The rest of the configuration and the effects and advantageous thereof are the same as those of the second embodiment.

It should be noted that, in the second to fourth embodiments, although the adsorbent temperature raising control is conducted by retarding the ignition timing, the invention should not be limited to this. This may be made by controlling the air/fuel ratio to a slightly lean value.

It should also be noted that, in the fourth embodiment, although the burning of the cloggy material is promoted using the air pump, this may alternatively be made by controlling the air/fuel ratio to a lean value.

It should further be noted that, in the second to fourth embodiments, although the regeneration is conducted based on the time X.DTM.COKE.OFF, it is alternatively possible to provide a sensor for detecting the degree of clogging and to conduct it based on the output of the sensor.

It should further be noted that, in the first to fourth embodiments, in addition to the type disclosed in the embodiment, the embodiment can also be applied to other types such as that proposed in Japanese Laid-Open Patent Application Hei 10 (1998)-159,54,4 in which the switch-over valve and the Exhaust conduit are provided downstream, in terms of the ordinary exhaust gas flow, of the bypass exhaust gas passage. In other words, the embodiment will be applied to an engine having a bypass exhaust gas passage branching from a main exhaust gas passage and again joining thereto and a switch-over valve for opening/closing the same, if it generates noise due to the valve chattering or resonance in the bypass exhaust gas passage.

It should further be noted that, in the first to fourth embodiments, the switch-over valve may be opened or closed by an electric actuator.

It should further be noted that, in the first to fourth embodiments, the adsorbent should not be limited to the type disclosed, any other type may be used if it has an excellent heat-proof property.

Thus, the foregoing embodiments are configured to have a system for purifying exhaust gas generated by an internal combustion 10 engine having a bypass exhaust gas passage 56 branching from an exhaust pipe 38 and is opened or closed by a switch-over valve 60, and at least one catalyst and an adsorbent 74 which adsorbs unburned components in the exhaust gas installed at the bypass exhaust passage, comprising: engine operating condition detecting means (ECU 114, crank angle sensor 90, manifold absolute pressure sensor 94) for detecting operating conditions of the engine including at least engine speed NE and engine load (manifold absolute pressure PBA); high engine speed and load region determining means (ECU 114, S34–S38, S30a, S106–S108) for comparing the detected engine speed and engine load with predetermined values (NEEF±α, NECH±β, NE.COKE, PB.COKE) and for determining whether engine operation is within a high engine speed and high load region; and switch-over valve operating means (ECU 114, S40, S30a, S112) for operating the switch-over valve to open the bypass exhaust passage if the bypass exhaust passage is closed when the engine operation is determined to be within the high engine speed and high load region.

In the system, the adsorbent 74 is installed at the bypass exhaust gas passage and includes; exhaust gas purifying means (ECU 114, S10–S26) for operating the switch-over valve to open the bypass exhaust gas passage to introduce the exhaust gas when a second catalyst 40, 42 installed upstream of the bypass exhaust gas passage has not activated such that the adsorbent adsorbs the unburned component and then to close the bypass exhaust gas passage to desorb the adsorbed unburned component from the adsorbent in such a way that the desorbed unburned component is recirculated upstream of the second catalyst; and desorption completion determining means (ECU 114, S28) for determining whether adsorption of the unburned component to the adsorbent and desorption therefrom have been completed; and wherein the switch-over valve operating means operates the switch-over valve to open the bypass exhaust gas passage after the adsorption and the desorption have been determined to be completed.

In the system, the adsorbent 74 is installed at the bypass exhaust gas passage and includes; exhaust gas temperature detecting means (ECU 114, temperature sensor 104a) for detecting temperature of the exhaust gas to be supplied to the adsorbent (fore-adsorbent temperature tmp.fr.trs); and temperature comparing means (ECU 114, S30a, S110) for comparing the detected temperature with a predetermined temperature (TMP.COKE) to determine if the detected temperature is greater or equal to the predetermined temperature; and wherein the switch-over valve operating means operates the switch-over valve to open the bypass exhaust passage if the detected temperature is determined to be greater or equal to the predetermined temperature when the engine operation is determined to be within the high engine speed and high load region.

The system further includes exhaust gas temperature raising means (ECU 114, S32a, S200–S210) for raising the exhaust gas temperature when the detected temperature is determined to be less than the predetermined value.

In the system, the exhaust gas temperature raising means raises the exhaust gas temperature by retarding the ignition timing supplied to the engine.

The system further includes oxygen increasing means (ECU 114, pipe 200, air pump 202, motor 204, S113) for increasing oxygen in the bypass exhaust gas passage to promote burning of cloggy material adhered to the adsorbent.

In the system, the switch-over valve operating means operates the switch-over valve to open the bypass exhaust gas passage to reduce noise generated by opening/closing of intake and exhaust valves 20, 34 and amplified by resonance of the bypass exhaust gas passage.

In the system, the switch-over valve operating means operates the switch-over valve to open at a position between a fully opened position and a fully closed position.

In the system, the switch-over valve operating means operates the switch-over valve to open the bypass exhaust gas passage to reduce noise generated by chattering of the switch-over valve 60.

In the system, the switch-over valve operating means operates the switch-over valve to open at a position between a fully opened position and a fully closed position.

In the system, the switch-over valve operating means operates the switch-over valve to open the bypass exhaust gas passage for a predetermined time (X.DTM.COKE.OFF; ECU 114, S30a, S114) to introduce the exhaust gas to burn away a cloggy material adhered to the adsorbent.

In the system, the predetermined time is determined based on at least the engine operating condition, environmental condition and a degree of deterioration of the adsorbent.

The system further includes time measuring means (ECU 114, S30a, S114) for measuring time lapse of the predetermined time (tm.coke); and wherein the time measuring means holds measured time when the switch-over valve operating means discontinues operating the switch-over valve to open the bypass exhaust gas passage.

While the invention has thus been shown and described with reference to specific embodiments, it should be noted that the invention is in no way limited to the details of the described arrangements but changes and modifications may be made without departing from the scope of the appended claims.

What is claimed is:

1. A system for purifying exhaust gas generated by an internal combustion engine having a bypass exhaust gas passage branching from an exhaust pipe and is opened or closed by a switch-over valve, and at least one catalyst and an adsorbent which adsorbs unburned components in the exhaust gas installed at the bypass exhaust passage, comprising:

engine operating condition detecting means for detecting operating conditions of the engine including at least engine speed and engine load;

high engine speed and load region determining means for comparing the detected engine speed and engine load with predetermined values and for determining whether engine operation is within a high engine speed and high load region; and switch-over valve operating means for operating the switch-over valve to open the bypass exhaust passage if the bypass exhaust passage is closed when the engine operation is determined to be within the high engine speed and high load region.

2. A system according to claim 1, wherein the adsorbent is installed at the bypass exhaust gas passage and includes:

exhaust gas purifying means for operating the switch-over valve to open the bypass exhaust gas passage to introduce the exhaust gas when a second catalyst installed upstream of the bypass exhaust gas passage has not activated such that the adsorbent adsorbs the unburned component and then closes the bypass exhaust gas passage to desorb the adsorbed unburned component from the adsorbent in such a way that the desorbed unburned component is recirculated upstream of the second catalyst; and desorption completion determining means for determining whether adsorption of the unburned component to the adsorbent and desorption therefrom have been completed;

wherein the switch-over valve operating means operates the switch-over valve to open the bypass exhaust gas passage after the adsorption and the desorption have been determined to be completed.

3. A system according to claim 2, wherein the switch-over valve operating means operates the switch-over valve to open the bypass exhaust gas passage for a predetermined time to introduce the exhaust gas to burn away cloggy material adhered to the adsorbent.

4. A system according to claim 3, wherein the predetermined time is determined based on at least the engine operating conditions, environmental conditions and a degree of deterioration of the adsorbent.

5. A system according to claim 3, further including:

time measuring means for measuring time lapse of the predetermined time;

and wherein the time measuring means holds measured time when the switch-over valve operating means discontinues operating the switch-over valve to open the bypass exhaust gas passage.

6. A system according to claim 1, wherein the adsorbent is installed at the bypass exhaust gas passage and includes:

exhaust gas temperature detecting means for detecting temperature of the exhaust gas to be supplied to the adsorbent; and temperature comparing means for comparing the detected temperature with a predetermined temperature to determine if the detected temperature is greater than or equal to the predetermined temperature;

wherein the switch-over valve operating means operates the switch-over valve to open the bypass exhaust passage if the detected temperature is determined to be greater or equal to the predetermined temperature when the engine operation is determined to be within the high engine speed and high load region.

7. A system according to claim 6, further including:

oxygen increasing means for increasing oxygen in the bypass exhaust gas passage to promote burning of a cloggy material adhered to the adsorbent.

8. A system according to claim 6, further including:

exhaust gas temperature raising means for raising the exhaust gas temperature when the detected temperature is determined to be less than the predetermined value.

9. A system according to claim 8, wherein the exhaust gas temperature raising means raises the exhaust gas temperature by retarding ignition timing to be supplied to the engine.

10. A system according to claim 1, wherein the switch-over valve operating means operates the switch-over valve to open the bypass exhaust gas passage to reduce noise generated by opening/closing of intake and exhaust valves and amplified by resonance of the bypass exhaust gas passage.

11. A system according to claim 10, wherein the switch-over valve operating means operates the switch-over valve to open at a position between a fully opened position and a filly closed position.

12. A system according to claim 1, wherein the switch-over valve operating means operates the switch-over valve to open the bypass exhaust gas passage to reduce noise generated by chattering of the switch-over valve.

13. A system according to claim 12, wherein the switch-over valve operating means operates the switch-over valve to open at a position between a fully opened position and a fully closed position.

14. A method purifying exhaust gas generated by an internal combustion engine having a bypass exhaust gas passage branching from an exhaust pipe and is opened or closed by a switch-over valve, and at least one of a catalyst and an adsorbent which adsorbs unburned components in the exhaust gas installed at the bypass exhaust passage, comprising the steps of:

(a) detecting operating conditions of the engine including at least engine speed and engine load;

(b) comparing the detected engine speed and engine load with predetermined values and for determining whether engine operation is within a high engine speed and high load region; and (c) operating the switch-over valve to open the bypass exhaust passage if the bypass exhaust passage is closed when the engine operation is determined to be within the high engine speed and high load region.

15. A method according to claim 14, wherein the adsorbent is installed at the bypass exhaust gas passage and includes the steps of:

(e) operating the switch-over valve to open the bypass exhaust gas passage to introduce the exhaust gas when a second catalyst installed upstream of the bypass exhaust gas passage has not activated such that the adsorbent adsorbs the unburned component and then to close the bypass exhaust gas passage to desorb the adsorbed unburned component from the adsorbent in such a way that the desorbed unburned component is recirculated upstream of the second catalyst; and (f) determining whether adsorption of the unburned component to the adsorbent and desorption therefrom have been completed;

wherein step (c) operating the switch-over valve to open the bypass exhaust gas passage after the adsorption and the desorption have been determined to be completed.

16. A method according to claim 15, wherein step (c) operating the switch-over valve to open the bypass exhaust gas passage for a predetermined time to introduce the exhaust gas to burn away a cloggy material adhered to the adsorbent.

17. A method according to claim 16, wherein the predetermined time is determined based on at least the engine operating conditions, environmental conditions and a degree of deterioration of the adsorbent.

18. A method according to claim 16, further including the step of:

(k) measuring time lapse of the predetermined time;

and wherein step (k) holding measured time when step (c) discontinuing operating the switch-over valve to open the bypass exhaust gas passage.

19. A method according to claim 14, wherein the adsorbent is installed at the bypass exhaust gas passage and includes steps of:

(g) detecting the temperature of the exhaust gas supplied to the adsorbent; and (h) comparing the detected temperature with a predetermined temperature to determine it the detected temperature is greater or equal to the predetermined temperature;

wherein step (c) operating the switch-over valve to open the bypass exhaust passage if the detected temperature is determined to be greater or equal to the predetermined temperature when the engine operation is determined to be within the high engine speed and high load region.

20. A method according to claim 19, further including the step of:

(j) increasing oxygen in the bypass exhaust gas passage to promote the burning of cloggy material adhered to the adsorbent.

21. A method according to claim 19, further including the step of:

(i) raising the exhaust gas temperature when the detected temperature is determined to be less than the predetermined value.

22. A method according to claim 21, wherein step (i) raising the exhaust gas temperature by retarding ignition timing to be supplied to the engine.

23. A method according to claim 14, wherein step (c) operating the switch-over valve to open the bypass exhaust gas passage to reduce noise generated by opening/closing of intake and exhaust valves and amplified by resonance of the bypass exhaust gas passage.

24. A method according to clam 23, wherein step (c) operating the switch-over valve to open at a position between a fully opened position and a fully closed position.

25. A method according to claim 14, wherein step (c) operating the switch-over valve to open the bypass exhaust gas passage to reduce noise generated by chattering of the switch-over valve.

26. A method according to claim 25, wherein step (c) operating the switch-over valve to open at a position between a fully opened position and a fully closed position.

* * * * *